(12) United States Patent  
Yamamoto et al.

(10) Patent No.: US 7,651,424 B2
(45) Date of Patent: Jan. 26, 2010

(54) BICYCLE FRONT DERAILLEUR

(75) Inventors: Kazufumi Yamamoto, Sakai (JP);
Nobuyoshi Fujii, Sakai (JP); Yoshiaki Nankou, Sakai (JP)

(73) Assignee: Shimano Inc., Osaka (JP)

( * ) Notice: Subject to any disclaimer, the term of this patent is extended or adjusted under 35 U.S.C. 154(b) by 379 days.

(21) Appl. No.: 11/491,909

(22) Filed: Jul. 25, 2006

(65) Prior Publication Data

US 2008/0026888 A1    Jan. 31, 2008

(51) Int. Cl.
*B62M 9/12* (2006.01)

(52) U.S. Cl. ........................................... 474/82

(58) Field of Classification Search ................. 474/140, 474/144–147, 151, 78–82; 403/187–201; *B62M 9/12*
See application file for complete search history.

(56) References Cited

U.S. PATENT DOCUMENTS

| 4,199,997 | A |   | 4/1980 | Isobe |
| 5,846,148 | A | * | 12/1998 | Fujii .......................... 474/80 |
| 6,039,153 | A |   | 3/2000 | Sugimoto |
| 6,349,799 | B1 |   | 2/2002 | Kariyama |
| 6,431,327 | B2 | * | 8/2002 | Lumpkin .................. 188/24.12 |
| 2005/0143206 | A1 |   | 6/2005 | Tetsuka |
| 2005/0204846 | A1 |   | 9/2005 | Valle et al. |
| 2006/0258494 | A1 |   | 11/2006 | Auer |

FOREIGN PATENT DOCUMENTS

| DE | 31 18 035 A1 | 2/1982 |
| JP | 53-102550 | 9/1978 |

* cited by examiner

*Primary Examiner*—Robert A Siconolfi
*Assistant Examiner*—Anna Momper
(74) *Attorney, Agent, or Firm*—Global IP Counselors, LLP

(57) ABSTRACT

A bicycle front derailleur includes a fixed member, a chain guide, a linkage assembly and an adjustable mounting fixture. The fixed member includes a frame mounting portion having at least one frame mounting hole and a linkage support portion. The linkage assembly is coupled between the linkage support portion and the chain guide in order to move the chain guide between the retracted position and the extended position. The mounting fixture is adjustably coupled to the fixed member. The mounting fixture including at least one frame fastener disposed in the frame mounting hole, a pair of first washer members disposed on a first side of the frame mounting portion and a pair of second washer members disposed on a second side of the frame mounting portion with the frame fastener extending through the first and second washer members.

10 Claims, 24 Drawing Sheets

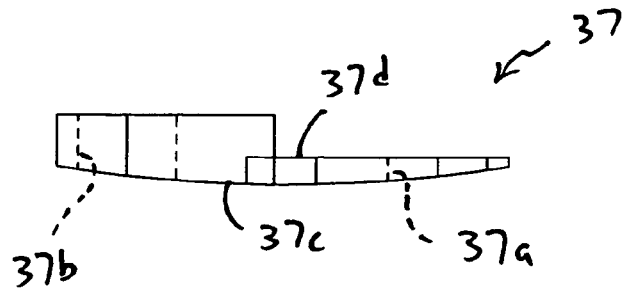
Fig. 17
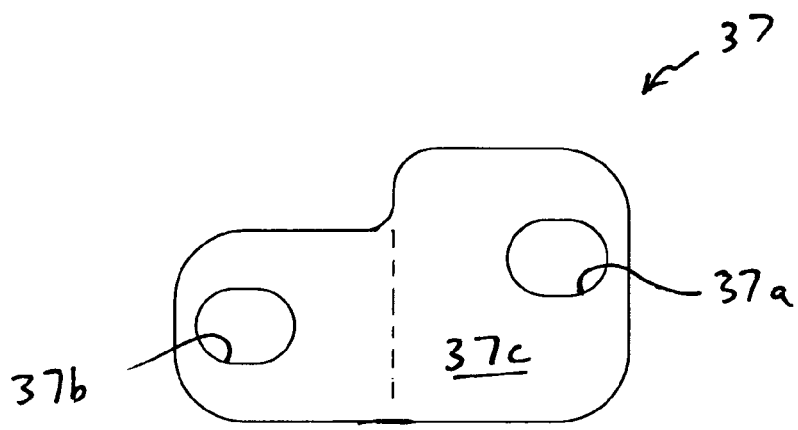
Fig. 18
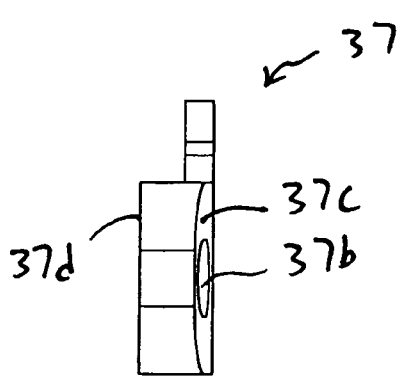 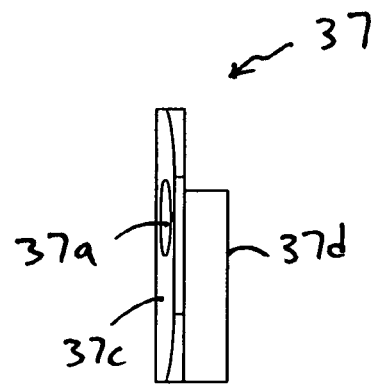
Fig. 19  Fig. 20

BICYCLE FRONT DERAILLEUR

BACKGROUND OF THE INVENTION

1. Field of the Invention

This invention generally relates to a bicycle front derailleur. More specifically, the present invention relates to a bicycle front derailleur, which is designed to be attached to a seat tube of a bicycle frame and which includes a mounting fixture adjustably coupled to the fixed member to adjust the angular orientation/position of the chain guide relative to the frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front derailleur.

Generally, a front derailleur includes a fixed member nonmovably secured to the bicycle frame and a movable member movably coupled to the fixed member using a linkage assembly so as to be laterally movable relative to the fixed member. The movable member includes an attachment portion and a chain guide with a pair of cage plates for contacting and moving a chain between the front sprockets. A biasing member normally biases the movable member and chain guide to a retracted position or an extended position relative to the fixed member. The fixed member of the front derailleur of the bicycle is typically mounted onto the bicycle frame adjacent to the front sprockets. Specifically, the front derailleur is usually clamped onto the seat tube of the frame.

The movable member is movable relative to the fixed member by pulling or releasing a shift control cable to move against or due to the biasing force of the biasing member. In particular, the movable member and fixed member usually are interconnected through pivotal links of the linkage assembly, while the control cable is connected to one of the pivotal links. Thus, upon pulling the shift control cable, a torque is applied to the link to move the movable member against the biasing force of the biasing member. Alternatively, when the shift control cable is released, the biasing member applies torque in the opposite direction to cause the movable member to move in the opposite direction. Depending on the arrangement and locations of the cable guides, the cable attachment member of the front derailleur may need to be configured differently for different types of frames.

While these front derailleurs generally work well, because they are clamped onto the seat tube, the position/orientation may not be optimal (i.e., shifting performance may not be optimal). In other words, it can be difficult to clamp these prior front derailleurs at the proper location. Moreover, it is possible for these types of front derailleurs to sometimes move slightly during use, due to a loosened fastener, repeated vibrations and/or contact with an obstruction or the like. Accordingly, some bicycles have been provided with permanent (i.e., welded or brazed-on) derailleur mounting portions that are fixed to the seat tube of the frame at the appropriate location. These permanent derailleur fastening structures generally work well. However, it is possible that during manufacture of bicycle frames with such permanent derailleur mounting portions for some variance in the various bicycle frames on the production line. Moreover, derailleurs can have different configurations among various models/brands. Accordingly, even when a permanent (i.e., welded or brazed-on) derailleur mounting portion fixed to the seat tube is utilized, the position/orientation may not be optimal (i.e., shifting performance may not be optimal).

In view of the above, it will be apparent to those skilled in the art from this disclosure that there exists a need for an improved bicycle front derailleur. This invention addresses this need in the art as well as other needs, which will become apparent to those skilled in the art from this disclosure.

SUMMARY OF THE INVENTION

One object of the present invention is to provide a bicycle front derailleur, which smoothly shifts a bicycle chain between a plurality of front sprockets or front chain rings.

Another object of the present invention is to provide bicycle front derailleur, which is designed to be mounted in an angularly adjustable manner to a permanent (e.g., welded or brazed-on) derailleur mounting portion of a seat tube using at least one fastener such as a bolt.

Another object of the present invention is to provide bicycle front derailleur, which is relatively simple and inexpensive to manufacture, assemble and attach to the bicycle frame.

The foregoing objects can basically be attained by providing a bicycle front derailleur, which includes a fixed member, a chain guide, a linkage assembly and a mounting fixture. The fixed member includes a frame mounting portion having at least one frame mounting hole and a linkage support portion. The chain guide is configured to move between a retracted position and an extended position relative to the fixed member. The linkage assembly is coupled between the linkage support portion and the chain guide in order to move the chain guide between the retracted position and the extended position. The mounting fixture is adjustably coupled to the fixed member. The mounting fixture including at least one frame fastener disposed in the frame mounting hole, a pair of first washer members disposed on a first side of the frame mounting portion and a pair of second washer members disposed on a second side of the frame mounting portion with the frame fastener extending through the first and second washer members.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 17 is an enlarged, top plan view of an inner second washer member of the mounting fixture of the front derailleur illustrated in FIGS. 1-8;

FIG. 18 is an outside elevational view of the inner second washer member illustrated in FIG. 17;

FIG. 19 is a rear elevational view of the inner second washer member illustrated in FIGS. 17 and 18;

FIG. 20 is a front elevational view of the inner second washer member illustrated in FIGS. 17-19;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
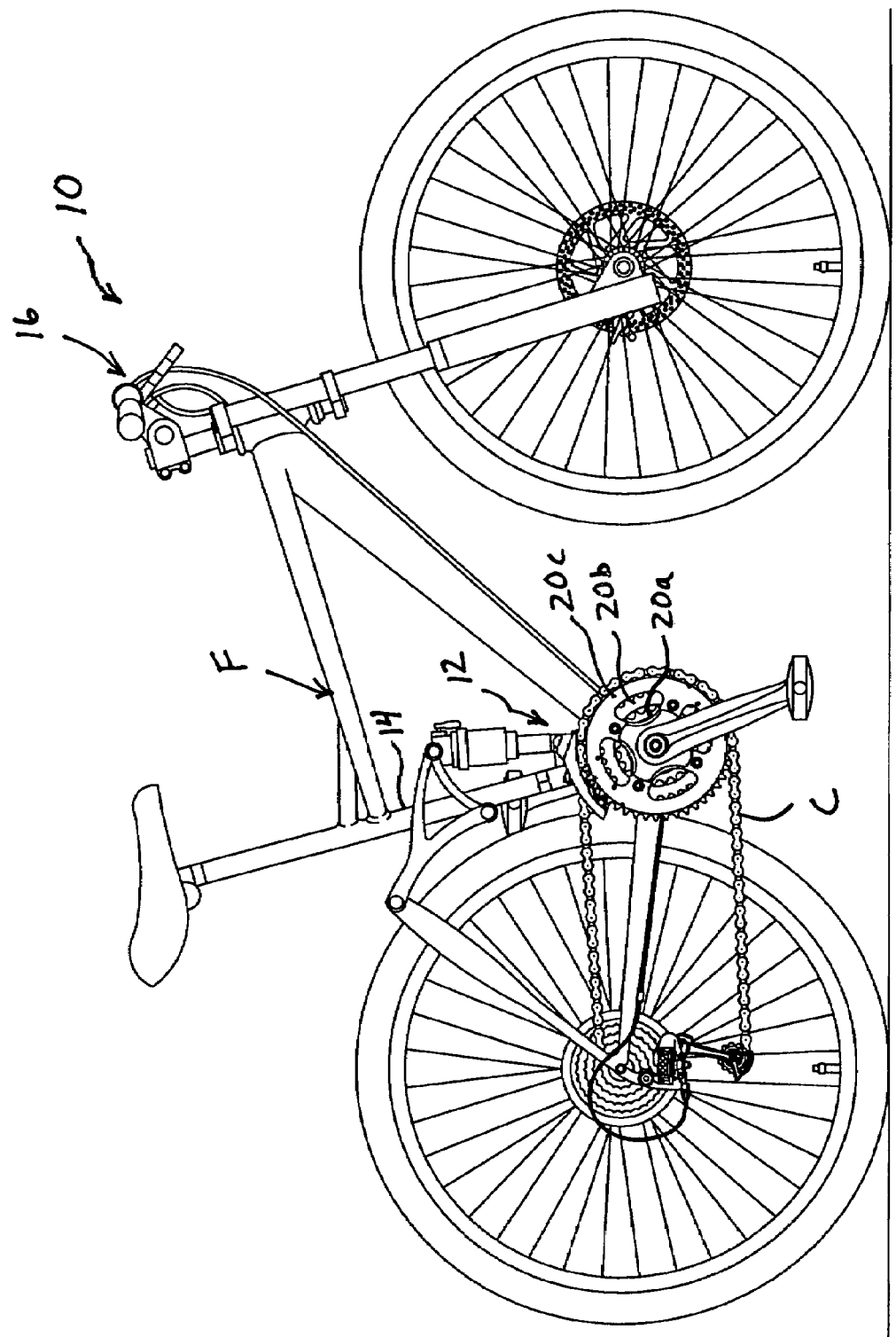
FIG. 1 is a side elevational view of a bicycle with a bicycle front derailleur coupled thereto in accordance with a first embodiment of the present invention.

Referring initially to FIG. 1, a bicycle 10 is illustrated with a front derailleur 12 fixedly coupled to a seat tube portion 14 of its frame F, in accordance with a first embodiment of the present invention. The front derailleur 12 is operated by a shifting unit 16 via a shift cable 18 to move a chain C between front sprockets or chain rings 20a, 20b and 20c of increasing size. Bicycles and their various components are well known in the art, and thus, the bicycle 10 and its various components will not be discussed and/or illustrated in detail herein except for the components that relate to the present invention. In other words, only the front derailleur 12 and the components that relate thereto will be discussed and/or illustrated in detail herein.

Referring to FIGS. 1-8, the front derailleur 12 of the present invention includes a fixed member 22, a cable attachment link 24, a support link 26, a chain guide 28 and a mounting fixture 30 adjustably coupled to the fixed member in accordance with the present invention. The fixed member 22 is fixedly attached to a mounting element 15 of the seat tube portion 14 in an adjustable manner using the mounting fixture 30 in accordance with the present invention, as explained below. Otherwise, the front derailleur 12 of the present invention is relatively conventional.

Figure 3:
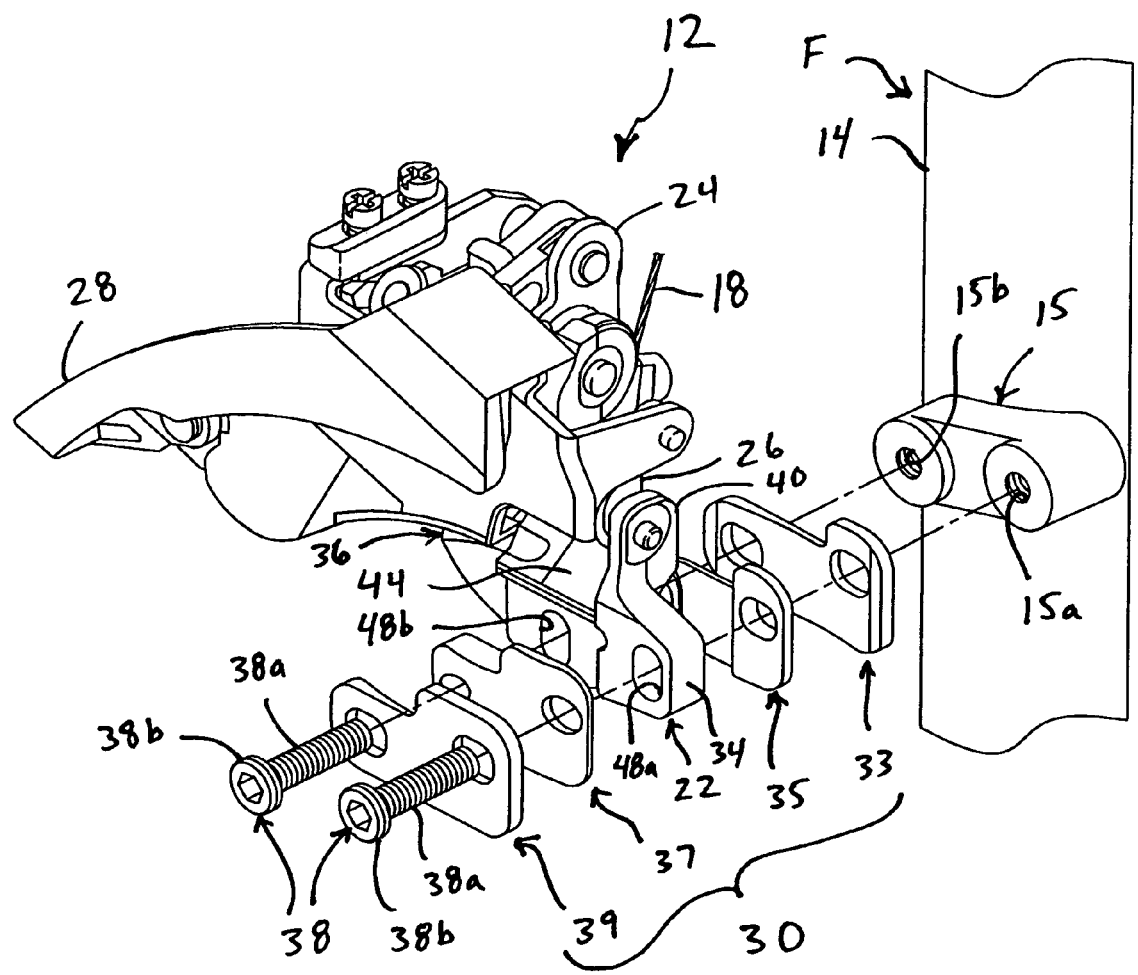
FIG. 3 is a further enlarged, partially exploded, perspective view of the bicycle front derailleur and frame illustrated in FIG. 2.
Figure 4:
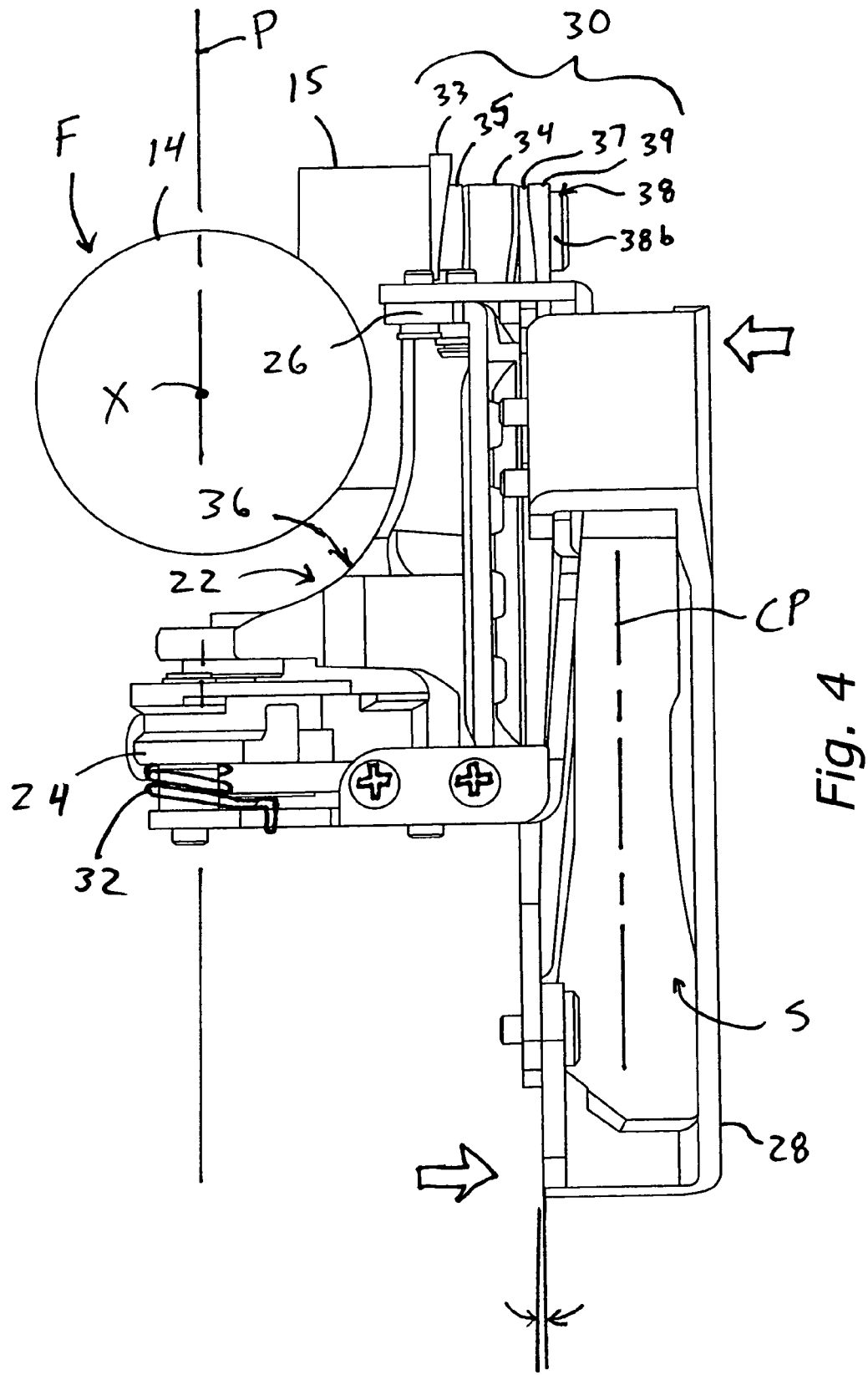
FIG. 4 is an enlarged, top plan view of the front derailleur illustrated in FIGS. 2 and 3, with the front derailleur mounted in a normal orientation relative to the seat tube attachment member.
Figure 5:
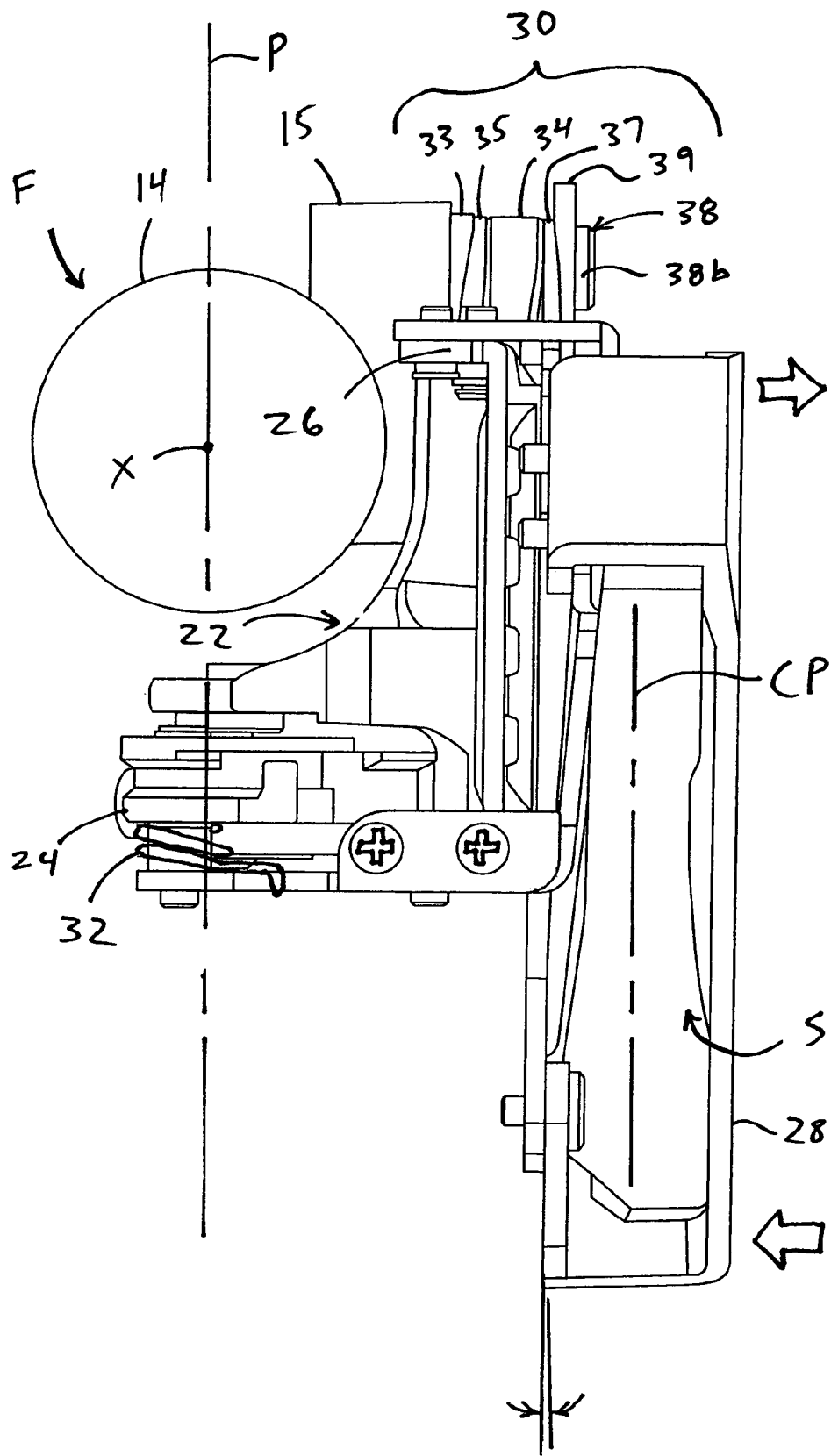
FIG. 5 is an enlarged, top plan view of the front derailleur illustrated in FIGS. 2 and 3, with the front derailleur mounted in an adjusted orientation relative to the seat tube attachment member.
Figure 6:
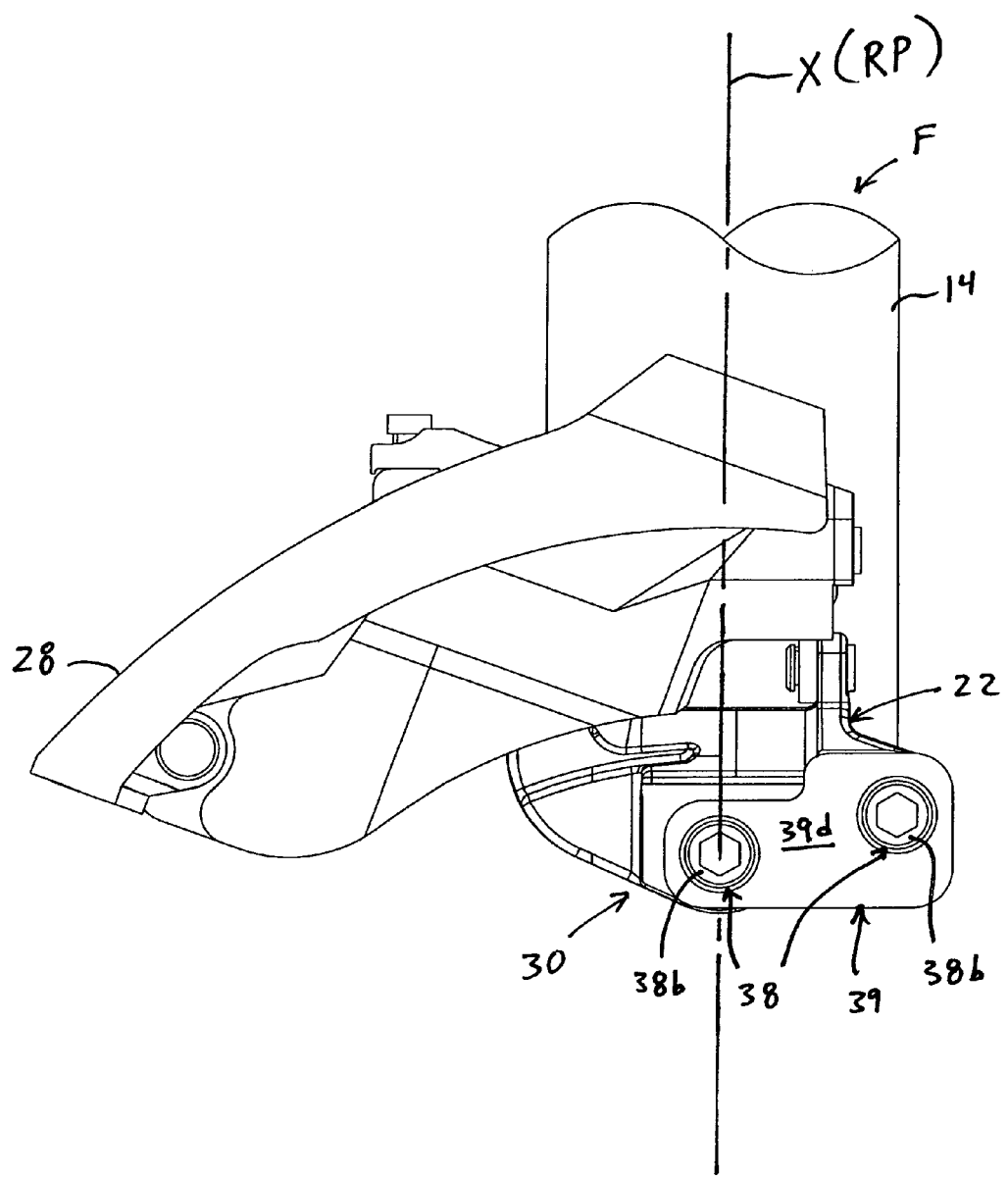
FIG. 6 is an enlarged outside elevational view of the front derailleur illustrated in FIGS. 1-5 with the seat tube illustrated but with other parts of the bicycle and the front crankset removed for the purpose of illustration.
Figure 7:
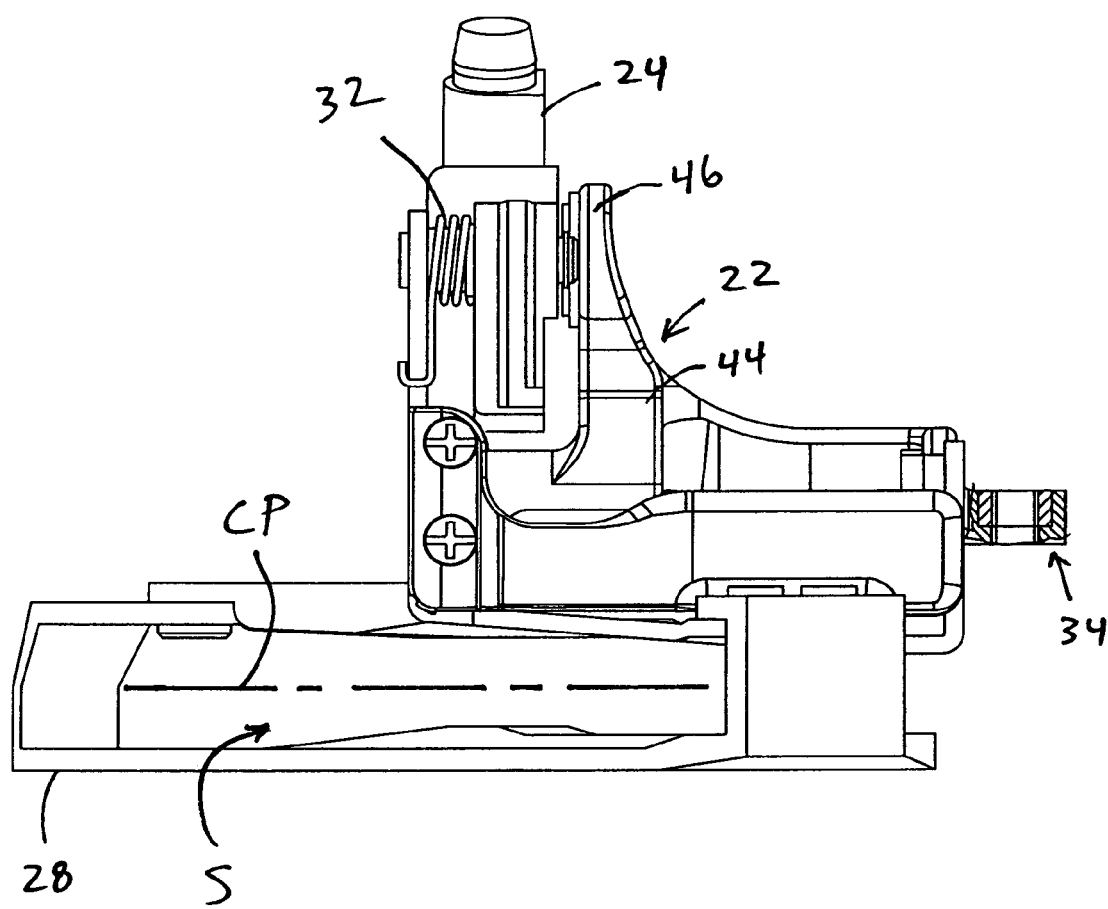
FIG. 7 is an enlarged, top plan view of the front derailleur illustrated in FIGS. 1-6 completely removed from the bicycle and with a portion shown in cross-section for the purpose of illustration.
Figure 8:
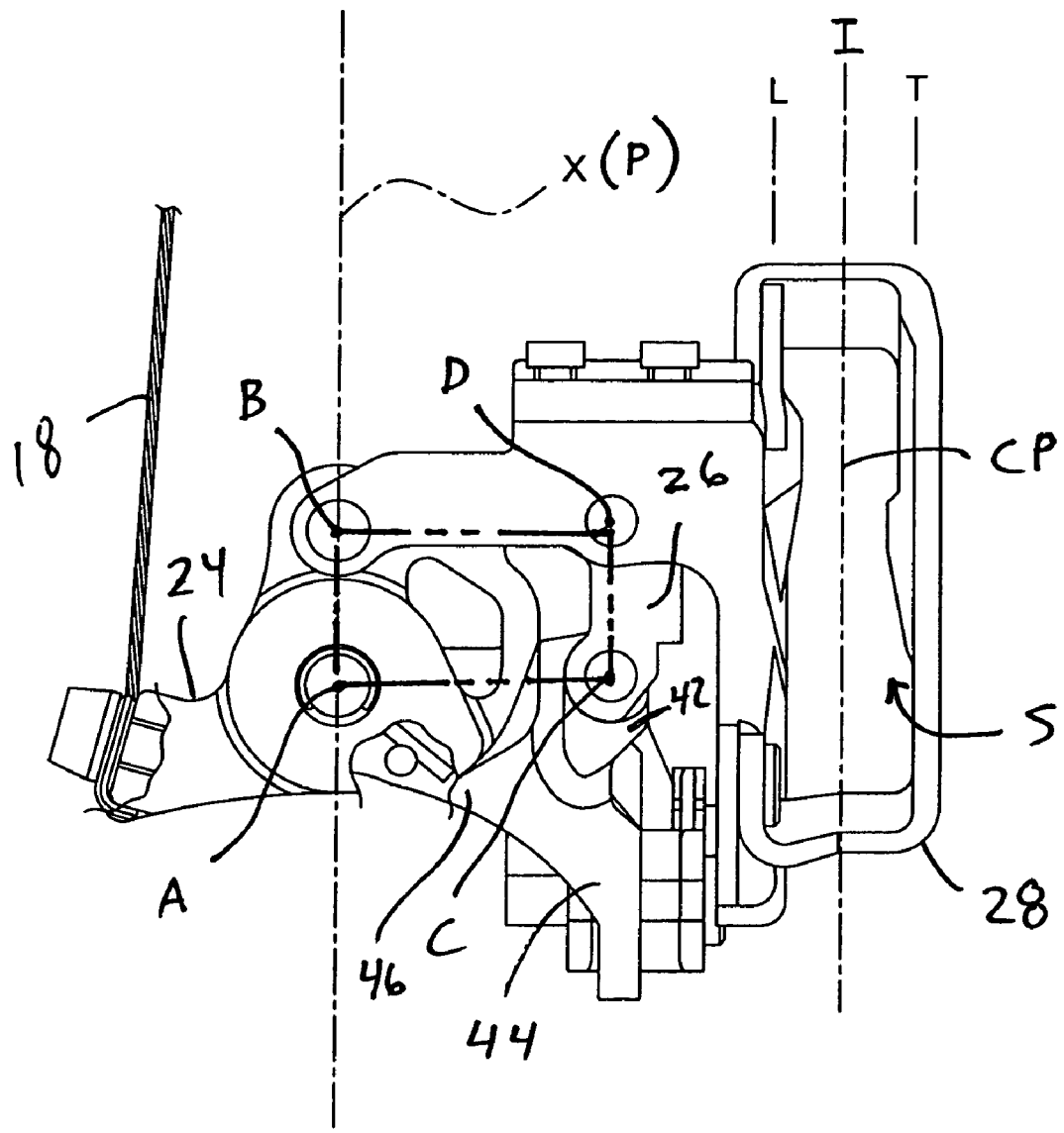
FIG. 8 is a rear elevational view of the front derailleur illustrated in FIG. 7.
Figure 9:
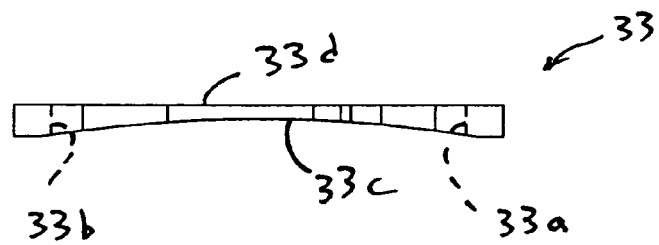
FIG. 9 is an enlarged, top plan view of an inner first washer member of the mounting fixture of the front derailleur illustrated in FIGS. 1-8.
Figure 10:
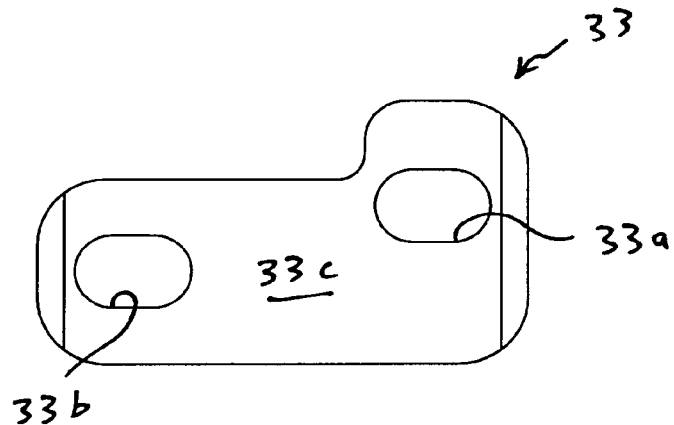
FIG. 10 is an outside elevational view of the inner first washer member illustrated in FIG. 9.
Figure 11:
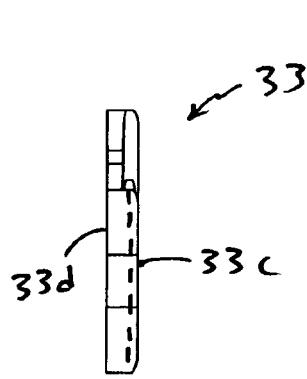
FIG. 11 is a rear elevational view of the inner first washer member illustrated in FIGS. 9 and 10.
Figure 12:
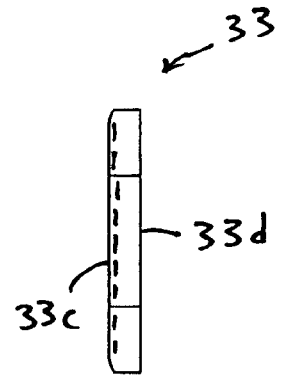
FIG. 12 is a front elevational view of the inner first washer member illustrated in FIGS. 9-11.
Figure 13:
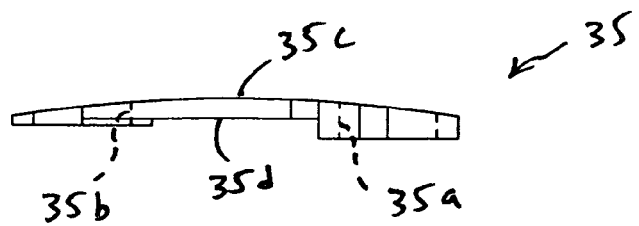
FIG. 13 is an enlarged, top plan view of an outer first washer member of the mounting fixture of the front derailleur illustrated in FIGS. 1-8.
Figure 14:
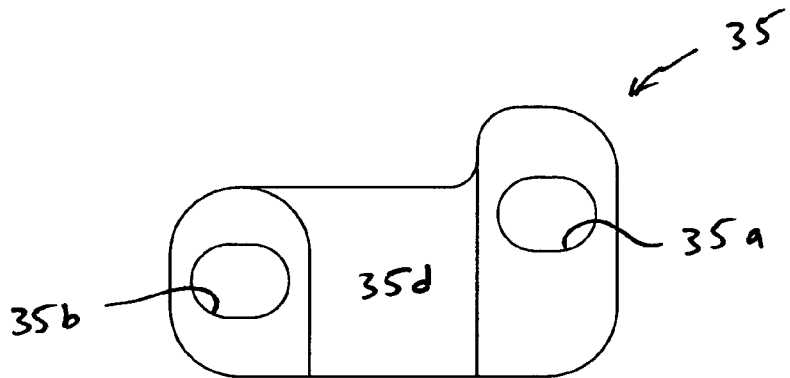
FIG. 14 is an outside elevational view of the outer first washer member illustrated in FIG. 13.
Figure 15:
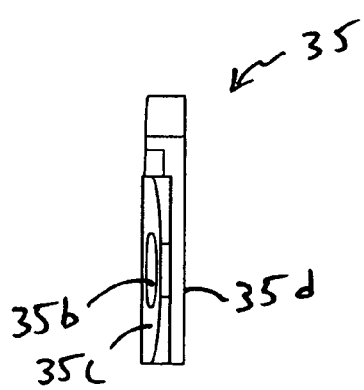
FIG. 15 is a rear elevational view of the outer first washer member illustrated in FIGS. 13 and 14.
Figure 16:
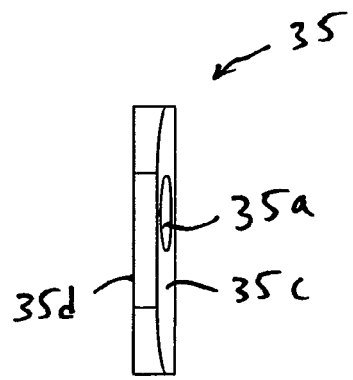
FIG. 16 is a front elevational view of the outer first washer member illustrated in FIGS. 13-15.
Figure 21:
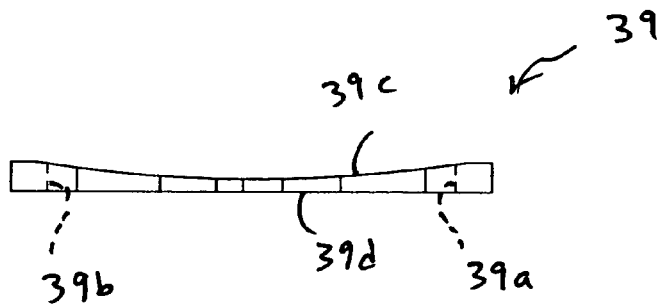
FIG. 21 is an enlarged, top plan view of an outer second washer member of the mounting fixture of the front derailleur illustrated in FIGS. 1-8.
Figure 22:
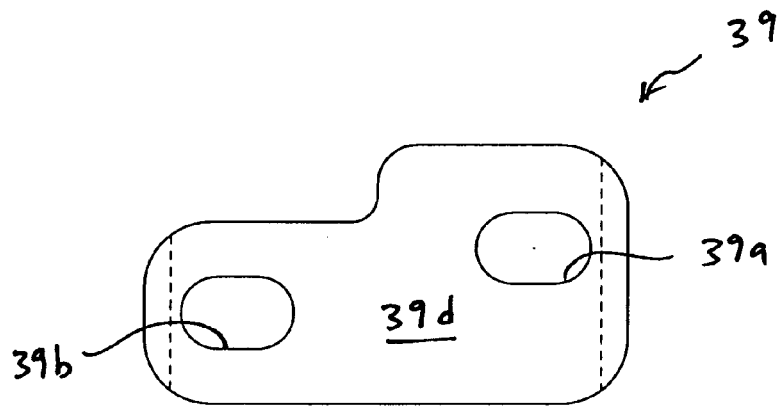
FIG. 22 is an outside elevational view of the outer second washer member illustrated in FIG. 21.
Figure 23:
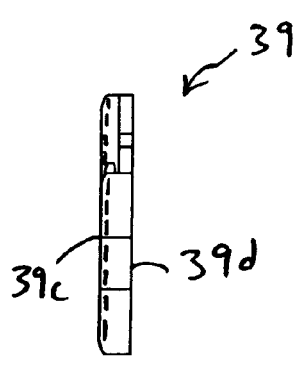
FIG. 23 is a rear elevational view of the outer second washer member illustrated in FIGS. 21 and 22.
Figure 24:
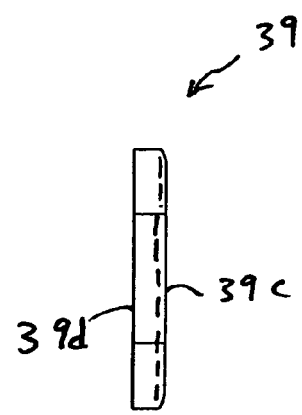
FIG. 24 is a front elevational view of the outer second washer member illustrated in FIGS. 21-23.
Figure 25:
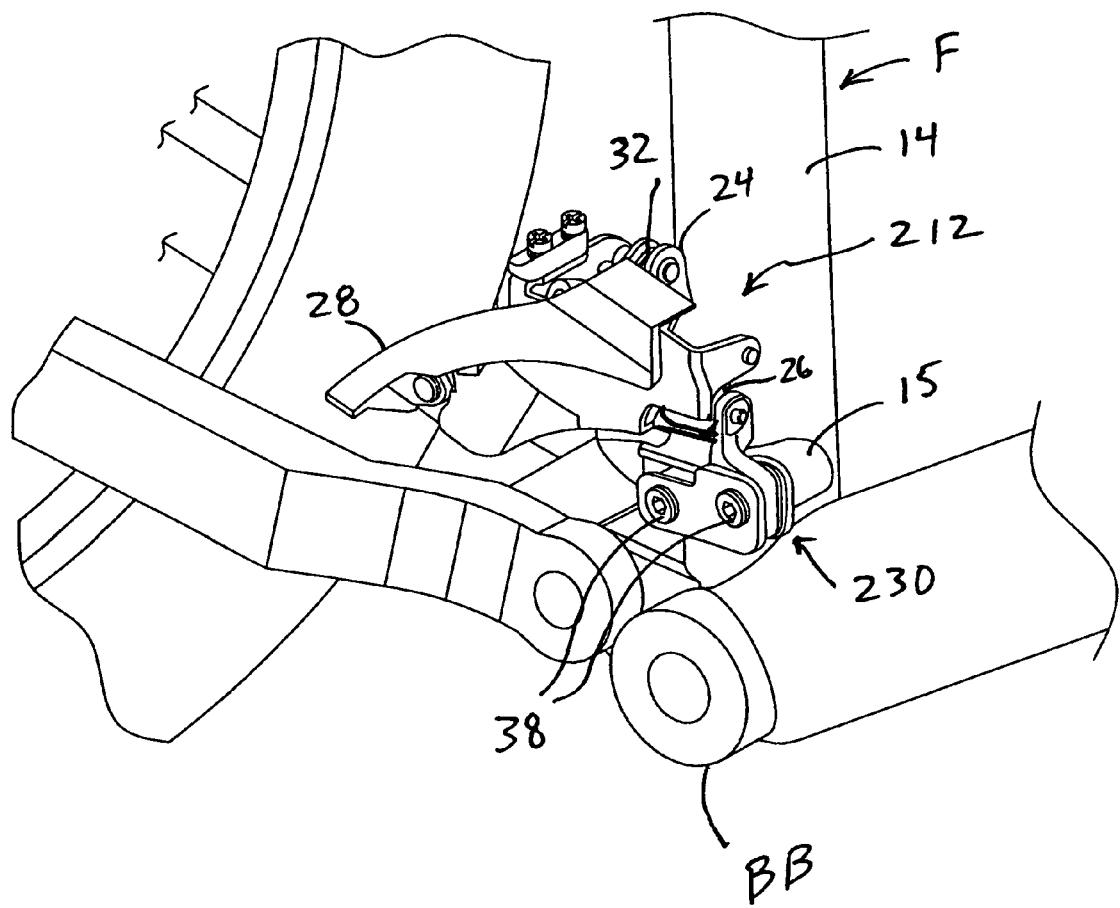
FIG. 25 is an enlarged, front perspective view of a portion of the frame of the bicycle illustrated in FIG. 1, with a bicycle front derailleur coupled thereto in accordance with a second embodiment of the present invention, and with the front crankset and chain removed for the purpose of illustration.
Figure 26:
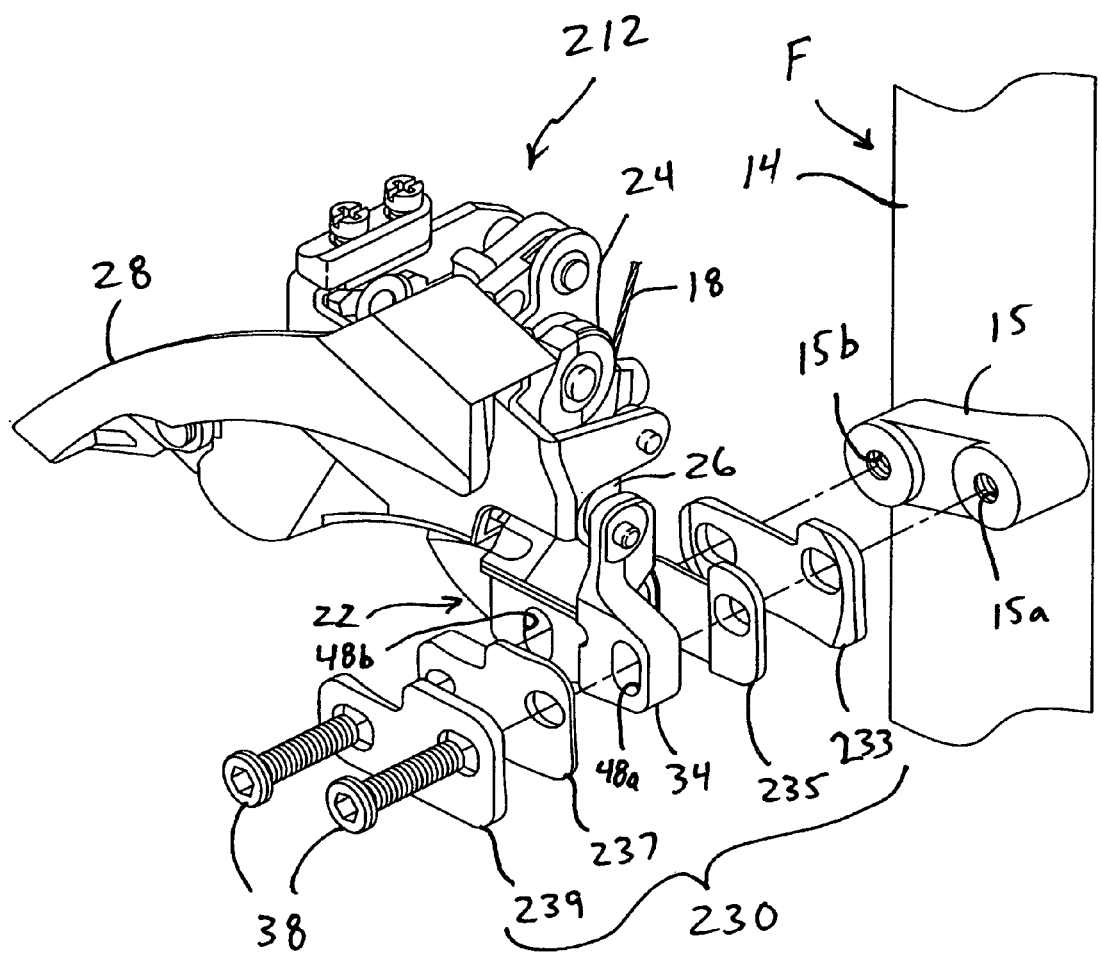
FIG. 26 is a further enlarged, partially exploded, perspective view of the bicycle front derailleur and frame illustrated in FIG. 25.

Referring now to FIGS. 2-8, portions of the fixed member 22, the cable attachment link 24, the support link 26 and the chain guide 28 form parts of a linkage assembly. The linkage assembly is preferably a four bar linkage assembly that is defined by four pivot axes A, B, C and D as best seen in FIGS. 5 and 6. A portion of the cable attachment link 24 defines a first link between the pivot axes A and B. A portion of the support link 26 defines a second link between the pivot axes C and D. A portion of the chain guide 28 defines a third link between the pivot axes B and D. A portion of the fixed member 22 defines a fourth link between the pivot axes A and C. Thus, the front derailleur 12 basically includes the fixed member 22, the chain guide 28 and the linkage assembly coupled between the fixed member 22 and the chain guide 28 to form the four-bar linkage. Thus, the chain guide 28 is movably supported on the fixed member 22 to move between a plurality of shift positions that correspond to the number of front sprockets in a conventional manner.

The fixed member 22, the cable attachment link 24, the support link 26 and the chain guide 28 are pivotally coupled together using pivot pins in a conventional manner. Thus, the chain guide 28 is movably coupled to the cable attachment link 24 and the support link 26 to move between a retracted (low gear) position L, an intermediate (middle gear) position I and a fully extended (top gear) position T relative to the fixed member 22, as best understood from FIG. 8. The support link 26 and the chain guide 28 have an adjustment mechanism coupled therebetween in a conventional manner to adjust the top and low positions T and L of the chain guide 28 in a conventional manner. The intermediate position I is also considered an extended position relative to the retracted low position L. Furthermore, the intermediate position I can be considered a retracted position relative to the top position T. In any case, the chain guide 28 is movable between at least one retracted position (e.g. the low position L) and at least one extended position (e.g. the intermediate position I). In other words, optionally, one of the front chain rings 20a, 20b and 20c (e.g. the largest front chain ring 20c corresponding to the top gear position T for the chain guide 28) may be eliminated such that only two front chain rings 20a and 20b are present in a conventional manner.

Referring still to FIGS. 2-8, the fixed member 22 is preferably located beneath the chain guide 28 (at least below the top portion of the chain guide 28 coupled to the cable attachment link 24 and the support link 26). The linkage assembly is preferably designed such that a biasing member (torsion spring) 32 normally biases the chain guide 28 in a transverse direction towards a longitudinal center plane P of the bicycle 10. In other words, the chain guide 28 is normally biased toward the retracted (low gear) position L. The biasing member 32 is preferably a torsion spring having a first end engaging the cable attachment link 24, and a second end engaging the fixed member 22 to normally bias the chain guide 28 from its extended most position to its retracted most position.

Thus, when the chain guide 28 is closest to the frame F of bicycle 10 in the retracted position, the chain guide 28 holds the chain C over the smallest front chain ring 20a that is closest to the seat tube portion 14. When the linkage assembly holds chain guide 28 furthest from the frame F of the bicycle 10 in its extended most position over the largest front chain ring 20c, the chain guide 28 is located over the outermost sprocket 20c to hold the chain C on the furthest sprocket 20c from the seat tube portion 14. Pulling the shift cable 18 causes the chain guide 28 to move laterally outwardly against the biasing force of the biasing member 32 (i.e., toward the largest front chain ring 20c), while releasing the shift cable 18 causes the chain guide 28 to move laterally inwardly due to the biasing force of the biasing member 32 (i.e., toward the smallest front chain ring 20a). The shift cable 18 is attached to the cable attachment link 24 using a cable attachment structure in a conventional manner to control movement of the linkage assembly based on rider input at the shifting unit 16.

The front derailleur 12 can be used with the shift cable 18 coming from above the front derailleur 12 as seen in FIG. 3, or with the shift cable 18 coming from below the front derailleur 12 (not shown) in a conventional manner. In either case, the rider operates the shifting unit 16 to selectively pull/release the shift cable 18 to move the chain guide 28 in a conventional manner. The shifting unit 16 is conventional and can be any of a variety of types of shifting units that takes-up and releases the shift cable 18 in response to rider input (e.g., movement of one or more levers or buttons in a conventional manner). Therefore, the precise structure of the shifting unit 16 will not be discussed or illustrated in detail herein.

The cable attachment link 24, the support link 26 and the chain guide 28 are each preferably constructed of a lightweight rigid material such as a metallic material in a conventional manner. The cable attachment link 24, the support link 26 and the chain guide 28 are conventional, except as explained and/or illustrated herein. Thus, the cable attachment link 24, the support link 26 and the chain guide 28 will not be discussed and/or illustrated in detail herein, except as related to the present invention.

Figure 2:
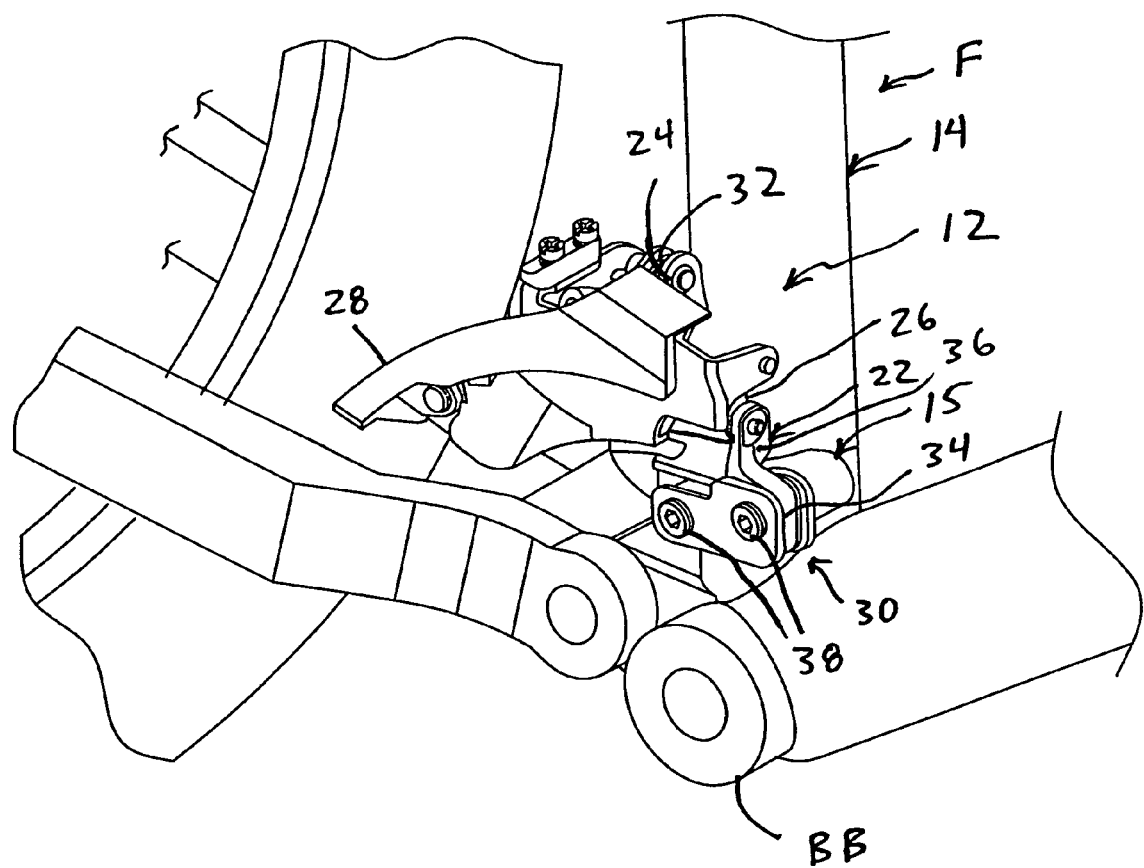
FIG. 2 is an enlarged, front perspective view of a portion of the frame of the bicycle illustrated in FIG. 1, with the bicycle front derailleur coupled thereto in accordance with the first embodiment of the present invention, and with the front crankset and chain removed for the purpose of illustration.

As best seen in FIGS. 2 and 3, the fixed member 22 is preferably fixedly attached to the mounting element 15 of the seat tube portion 14 using the mounting fixture 30. The mounting element 15 is welded or brazed to the seat tube portion 14 to form a part thereof. The mounting element 15 is located at a vertical position such that the front derailleur 12 can be properly vertically oriented relative to the front chain rings 20a, 20b and 20c (particularly, the smallest chain ring 20a). As used herein, the term "vertical" refers to a direction substantially parallel to a center axis X of the seat tube portion 14. The center axis X lies in a longitudinal center plane P of the bicycle 10. The mounting element 15 has a pair of threaded attachment holes 15a and 15b used to attach the fixed member 22 thereto using the mounting fixture 30, as explained below. The attachment hole 15a is located forward of the attachment hole 15b. The attachment hole 15b is preferably substantially aligned with the center axis X of the seat tube portion 14 when viewed axially along the attachment hole 15b, as seen in FIG. 6.

Referring still to FIGS. 2-8, the fixed member 22 basically includes a frame mounting portion 34 and a linkage support portion 36 non-movably fixed to the frame mounting portion 34, as explained below. A pair of fasteners 38 are used to fixedly attach the frame mounting portion 34 to the mounting element 15 of the seat tube portion 14, as best understood from FIGS. 2 and 3. Specifically, the frame mounting portion 34 has a pair of (unthreaded) frame mounting holes 48a and 48b, which receive the fasteners 38 therethrough, as best seen in FIG. 3. Preferably, the fasteners 38 are threaded fasteners such as bolts with each having a threaded shaft portion 38a and an enlarged head portion 38b used to facilitate rotation with a tool (e.g., with a hexagonal bore or the like) in a conventional manner. Thus, the fasteners 38 can be threadedly disposed in the attachment holes 15a and 15b. Accordingly, the frame mounting holes 48a and 48b as well as the fasteners 38 extend in a direction substantially perpendicular to a longitudinal center plane CP of a chain receiving space S of the chain guide 28, as best understood from FIGS. 6-8. In this embodiment, the frame mounting portion 34 and the linkage support portion 36 are integrally formed together as a one-piece, unitary member.

Referring now to FIGS. 2-24, the mounting fixture 30 in accordance with this embodiment of the present invention will now be explained in more detail. The mounting fixture 30 basically includes the pair of fasteners 38 and a plurality of washer members 33, 35, 37 and 39 that cooperate with the frame mounting portion 34 and the mounting element 15 to attach the front derailleur 12 to the seat tube portion 14 in an adjustable manner, as explained below. In particular, the washer members 33 and 35 are arranged on one side of the frame mounting portion 34, while the washer members 37 and 39 are arranged on the other side of the frame mounting portion 34. The fasteners 38 extend through the washer members 33, 35, 37 and 39 and through the frame mounting portion 34 into the attachment holes 15a and 15b. The washer members 33 and 35 can be considered a pair of first washer members disposed on a first side of the frame mounting portion 34, while the washer members 37 and 39 can be considered a pair of second washer members disposed on a second side of the frame mounting portion 34.

Each of the washer members 33, 35, 37 and 39 is preferably constructed of a light weight rigid material such as a metallic material as a one-piece, unitary member. However, it will be apparent to those skilled in the art from this disclosure that the washer members 33, 35, 37 and 39 can have other configurations and/or can be constructed of other materials that are well known in the bicycle art if needed and/or desired.

The washer member 33 is disposed adjacent the mounting element 15, while the washer member 35 is disposed between the washer member 33 and the frame mounting portion 34. The washer member 37 is disposed between the frame mounting portion 34 and the washer member 39, while the washer member 39 is disposed between the washer member 37 and the heads 38b of the fasteners 38. The mounting element 15, the fasteners 38, the frame mounting portion 34 and the washer members 33, 35, 37 and 39 cooperate with each other to adjust the angular orientation and/or position of the front derailleur 12 relative to the mounting element 15 of the frame F 14.

The washer member 33 has a pair of through holes 33a and 33b extending between a (concave) contact surface 33c and a support surface 33d, as seen in FIGS. 9-12. The through holes 33a and 33b are aligned with the attachment holes 15a and 15b, respectively. The through holes 33a and 33b are also aligned with the frame mounting holes 48a and 48b, respectively. Similarly, the washer member 35 has a pair of through holes 35a and 35b extending between a (convex) contact surface 35c and a support surface 35d, as seen in FIGS. 13-16. The through holes 35a and 35b are aligned with the attachment holes 15a and 15b, respectively. The through holes 35a and 35b are also aligned with the frame mounting holes 48a and 48b, respectively. Thus, the through holes 35a and 35b are also aligned with the through holes 33a and 33b, respectively. The contact surface 33c can be considered a first concave contact surface, while the contact surface 35c can be considered a first convex contact surface.

The support surface 33d is a flat surface that contacts the mounting element 15. The support surface 35d is a stepped surface that contacts a mating surface of the frame mounting portion 34. The contact surfaces 33c and 35c are mating adjustment surfaces that have substantially cylindrical configurations as viewed vertically, as best understood from FIGS. 3 and 9-16. The through holes 33a, 33b, 35a and 35b are elongated in a direction perpendicular to the vertical direction (i.e. in a direction substantially parallel to the longitudinal center plane P of the bicycle 10). Thus, the washer members 33 and 35 can move longitudinally relative to each other to adjust the angular orientation of the support surface 35d relative to the support surface 33d due to the cylindrical configurations of the contact surfaces 33c and 35c.

The through holes 33a, 33b, 35a and 35b receive the threaded shafts 38a of the fasteners 38 therethrough. Preferably, the through holes 33a and 33b are slightly longer than the through holes 35a and 35b. In any case, all of the through holes 33a, 33b, 35a and 35b have a vertical height slightly larger than the width of the threaded shafts 38a, and an elongated longitudinal length significantly longer (e.g. about two times longer) than the width of the threaded shafts 38a to permit longitudinal movement relative thereto. Thus, the through holes 33a, 33b, 35a and 35b are preferably elongated in a direction perpendicular to the elongated direction of the frame mounting holes 48a and 48b of the frame mounting portion 34.

Referring still to FIGS. 2-24, the washer members 37 and 39 are mounted on an opposite side of the frame mounting portion 34 from the washer members 33 and 35, as mentioned above. However, the washer members 37 and 39 function in a manner similar to the washer members 33 and 35. Thus, the washer members 37 and 39 are similar to the washer members 33 and 35. The washer member 37 has a pair of through holes 37a and 37b extending between a (convex) contact surface 37c and a support surface 37d, as seen in FIGS. 17-20. The through holes 37a and 37b are aligned with the attachment holes 15a and 15b, respectively. The through holes 37a and 37b are also aligned with the frame mounting holes 48a and 48b, respectively. Similarly, the washer member 39 has a pair of through holes 39a and 39b extending between a (concave) contact surface 39c and a support surface 39d, as seen in FIGS. 21-24. The through holes 39a and 39b are aligned with the attachment holes 15a and 15b, respectively. The through holes 39a and 39b are also aligned with the frame mounting holes 48a and 48b, respectively. Thus, the through holes 39a and 39b are also aligned with the through holes 37a and 37b, respectively. The contact surface 39c can be considered a second concave contact surface, while the contact surface 37c can be considered a second convex contact surface.

The support surface 37d is a stepped surface that contacts a mating surface of the frame mounting portion 34 in a manner similar to the stepped support surface 35d. The support surface 39d is a flat surface that contacts the heads 38b of the fasteners 38. The contact surfaces 37c and 39c are mating adjustment surfaces that have substantially cylindrical configurations as viewed vertically, as best understood from FIGS. 3 and 17-24. The through holes 37a, 37b, 39a and 39b are elongated in a direction perpendicular to the vertical direction (i.e. in a direction substantially parallel to the longitudinal center plane P of the bicycle 10). Thus, the washer members 37 and 39 can move longitudinally relative to each other to adjust the angular orientation of the support surface 37d relative to the support surface 39d due to the cylindrical configurations of the contact surfaces 37c and 39c.

The through holes 37a, 37b, 39a and 39b receive the threaded shafts 38a of the fasteners 38 therethrough. Preferably, the through holes 39a and 39b are slightly longer than the through holes 37a and 37b. In any case, all of the through holes 37a, 37b, 39a and 39b have a vertical height slightly larger than the width of the threaded shafts 38a, and an elongated longitudinal length significantly longer (e.g. about two times longer) than the width of the threaded shafts 38a to permit longitudinal movement relative thereto. Thus, the through holes 37a, 37b, 39a and 39b are preferably elongated in a direction perpendicular to the elongated direction of the frame mounting holes 48a and 48b of the frame mounting portion 34.

Referring again to FIGS. 2-8, the frame mounting portion 34 and the linkage support portion 36 are each preferably constructed of a lightweight, rigid material that is well known in the bicycle art. In the illustrated embodiment, the frame mounting portion 34 and the linkage support portion 36 are each constructed of a metallic material. However, it will be apparent to those skilled in the art from this disclosure that the frame mounting portion 34 and the linkage support portion 36 could be constructed of other materials that are well known in the bicycle art such as a hard rigid plastic material. Moreover, the frame mounting portion 34 and the linkage support portion 36 could each be constructed of a different material if needed and/or desired. In the illustrated embodiment, the frame mounting portion 34 and the linkage support portion 36 are preferably constructed by utilizing conventional manufacturing techniques such as casting and/or machining.

Referring still to FIGS. 2-8, the linkage support portion 36 includes portions of the linkage assembly. In particular, portions of the linkage assembly are preferably integrally formed with the linkage support portion 36. Specifically, the linkage support portion 36 has a pair (first and second) of mounting flanges 40 and 42 that extend outwardly/upwardly from a fastening portion 44 and an additional (third) mounting portion of flange 46 extending laterally/inwardly from the fastening portion 44. The first and second mounting flanges 40 and 42 have one end of the support link 26 pivotally coupled thereto, while the third mounting flange 46 has the cable attachment link 24 pivotally coupled thereto. The cable attachment link 24 is also pivotally coupled to the chain guide 28 at a location spaced from the third mounting flange 46, while the support link 26 is also pivotally coupled to the chain guide 28 at locations spaced from the first and second mounting flanges 40 and 42. Thus, the support link 26 is pivotally coupled to the fixed member 22 for rotation about the pivot axis C, while the cable attachment link 24 is pivotally coupled to the fixed member 22 for rotation about the pivot axis A. The fastening portion 44 is rigidly coupled with the frame mounting portion 34.

The frame mounting portion 34 is attached to the mounting element 15 of the seat tube portion 14 via the fasteners 38. Specifically, the frame mounting portion 34 has the pair of frame mounting holes 48a and 48b extending therethrough, which receive shafts 38a of the fasteners 38 therethrough in order to fixedly attach the frame mounting portion 34 to the mounting element 15 (i.e., via the threaded attachment holes 15a and 15b, respectively). Thus, the frame mounting portion 34 is non-movable relative to the seat tube portion 14 when fixedly attached thereto with the fasteners 38. The frame mounting (through) holes 48a and 48b are preferably slightly elongated in a vertical direction (parallel to the center axis X of the seat tube portion 14 such that the vertical position of the front derailleur 12 can be slightly adjusted relative to the seat tube portion 14 (i.e. the mounting element 15) and/or the front chain rings 20a, 20b and 20c.

Specifically, the frame mounting holes 48a and 48b have an elongated vertical dimension that is larger than (e.g., about twice as large as) the transverse width of the shafts 38a, and a transverse dimension substantially the same or only slightly larger than the width of the shafts 38a of the fasteners 38. The frame mounting hole 48a is located forwardly of the through hole 48b such that the frame mounting holes 48a and 48b are aligned with the threaded attachment holes 15a and 15b, respectively. The frame mounting hole 48a and the attachment hole 15a are preferably aligned with a forward most edge of the seat tube 14 when viewed axially along the through hole 48a, as best understood from FIGS. 3-6. The frame mounting hole 48b and the attachment hole 15b are preferably aligned with the center axis X of the seat tube portion 14 when viewed axially along the frame mounting hole 48b, as best understood from FIGS. 3-6. A vertically arranged seat tube reference plane RP of the frame mounting portion 34 is aligned with the center axis X of the seat tube portion 14. Preferably, the seat tube reference plane RP passes through the center of the through hole 48b. The seat tube reference plane RP is perpendicular to the longitudinal center plane P of the bicycle 10.

Referring still to FIGS. 2-8, installation/mounting of the front derailleur 12 on the bicycle 10 will now be explained in more detail. Prior to installation of the front derailleur 12 on the seat tube portion 14, the mounting fixture 30 is arranged as shown in FIG. 3. The fasteners 38 are then partially installed. In particular, the threaded shafts 38a are inserted through the washer member 39, the washer member 37, the frame mounting portion 34, the washer member 35 and the washer member 33, partially threaded into the threaded attachment holes 15a and 15b. The position/orientation of the front derailleur 12 is then adjusted, prior to fully tightening the fasteners 38. Due to the configuration of the mounting fixture 30, both the position (vertical/horizontal) and the angular orientation (yaw) of the front derailleur 12 can be slightly adjusted, as best understood from FIGS. 4 and 5. Once the front derailleur 12 is properly positioned/oriented, the fasteners 38 are fully tightened such that the front derailleur 12 is non-movably fixed to the seat tube portion 14 in the proper location and orientation. An alignment jig 50, discussed below, is preferably used in order to properly position/orient the front derailleur 12 when the fasteners 38 are partially tightened.

In any case, the (first) washer members 33 and 35 are adjustable relative to each other to contact each other in different orientations in order vary an angular orientation of the chain guide 28 relative to the frame fasteners 38, and the (second) washer members 37 and 39 are adjustable relative to each other to contact each other in different orientations in order vary the angular orientation of the chain guide 28 relative to the frame fasteners 38. In other words, the washer members 33, 35, 37 and 39 as well as the frame mounting portion 34 cooperate with each other to form a ball and socket type arrangement to adjust the angular orientation of the chain guide 28 relative to the seat tube portion 14.

Second Embodiment

Referring now to FIGS. 25-48, a bicycle front derailleur 212 in accordance with a second embodiment of the present invention will now be explained. The bicycle front derailleur 212 of this second embodiment is identical to the front derailleur 12 of the first embodiment, except that the front derailleur 212 of this second embodiment includes a modified mounting fixture 230. Specifically, the modified mounting fixture 230 of this second embodiment includes modified washer members 233, 235, 237 and 239.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "200" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

The modified washer members 233, 235, 237 and 239 are identical to the washer members 33, 35, 37 and 39 of the first embodiment, except that the washer members 233, 235, 237 and 239 include contact surfaces 233c, 235c, 237c and 239c that have substantially spherical configurations. Thus, the washer member 233 has a pair of through holes 233a and 233b extending between the contact surface 233c and a support surface 233d, the washer member 235 has a pair of through holes 235a and 235b extending between the contact surface 235c and a support surface 235d, the washer member 237 has a pair of through holes 237a and 237b extending between the contact surface 237c and a support surface 237d, and the washer member 239 has a pair of through holes 239a and 239b extending between the contact surface 239c and a support surface 239d. The through holes 233a, 233b, 235a, 235b, 237a, 237b, 239a and 239b are identical to those of the first embodiment, except that they are slightly modified due to spherical configurations of the modified contact surfaces 233c, 235c, 237c and 239c. The support surfaces 233d, 235d, 237d and 239d are identical to those of the first embodiment.

Figure 27:
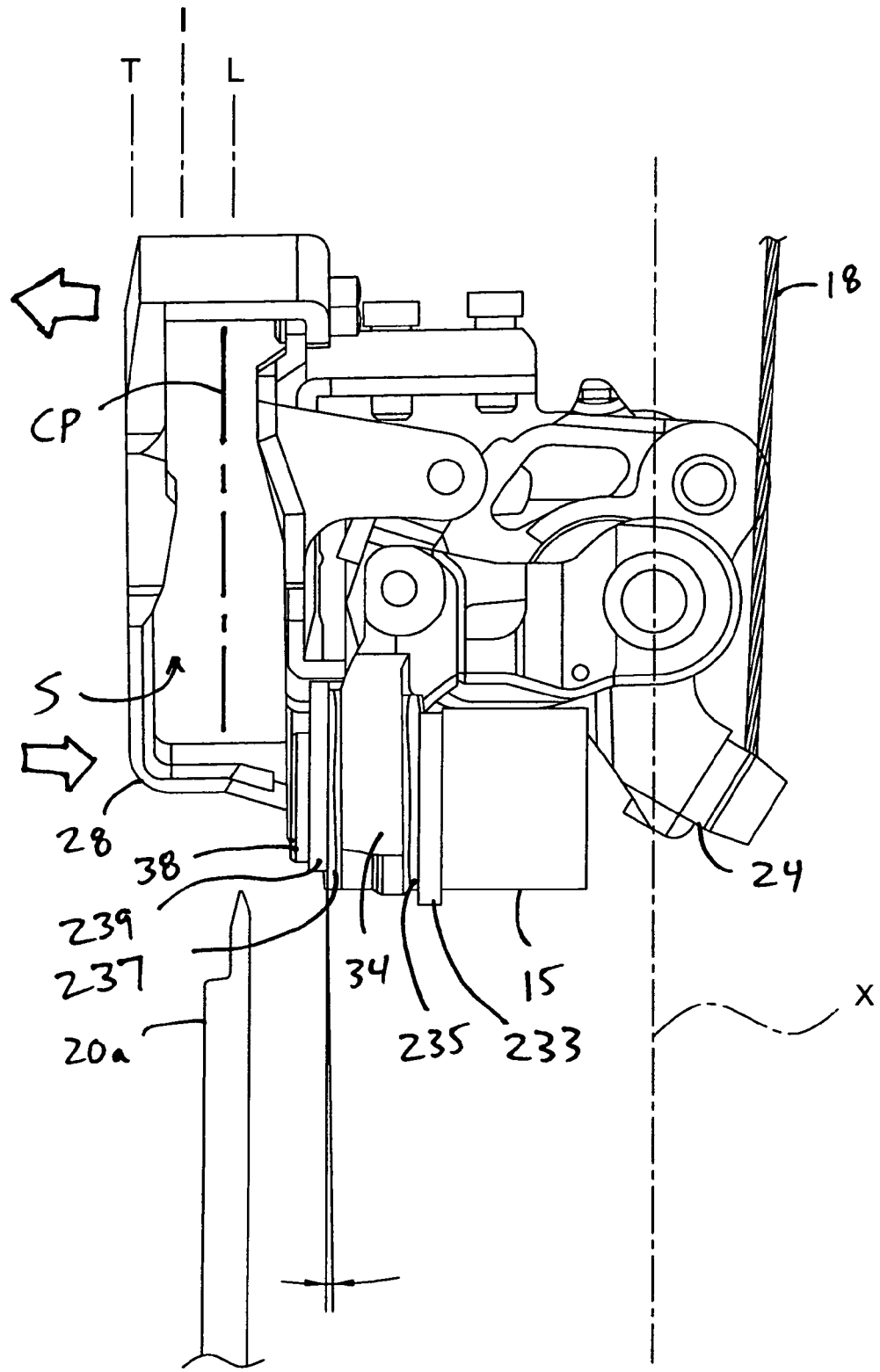
FIG. 27 is a front elevational view of the front derailleur illustrated in FIGS. 25 and 26 and the smallest front chain ring illustrated in FIG. 1, with the front derailleur mounted in a normal orientation relative to the seat tube attachment member.
Figure 28:
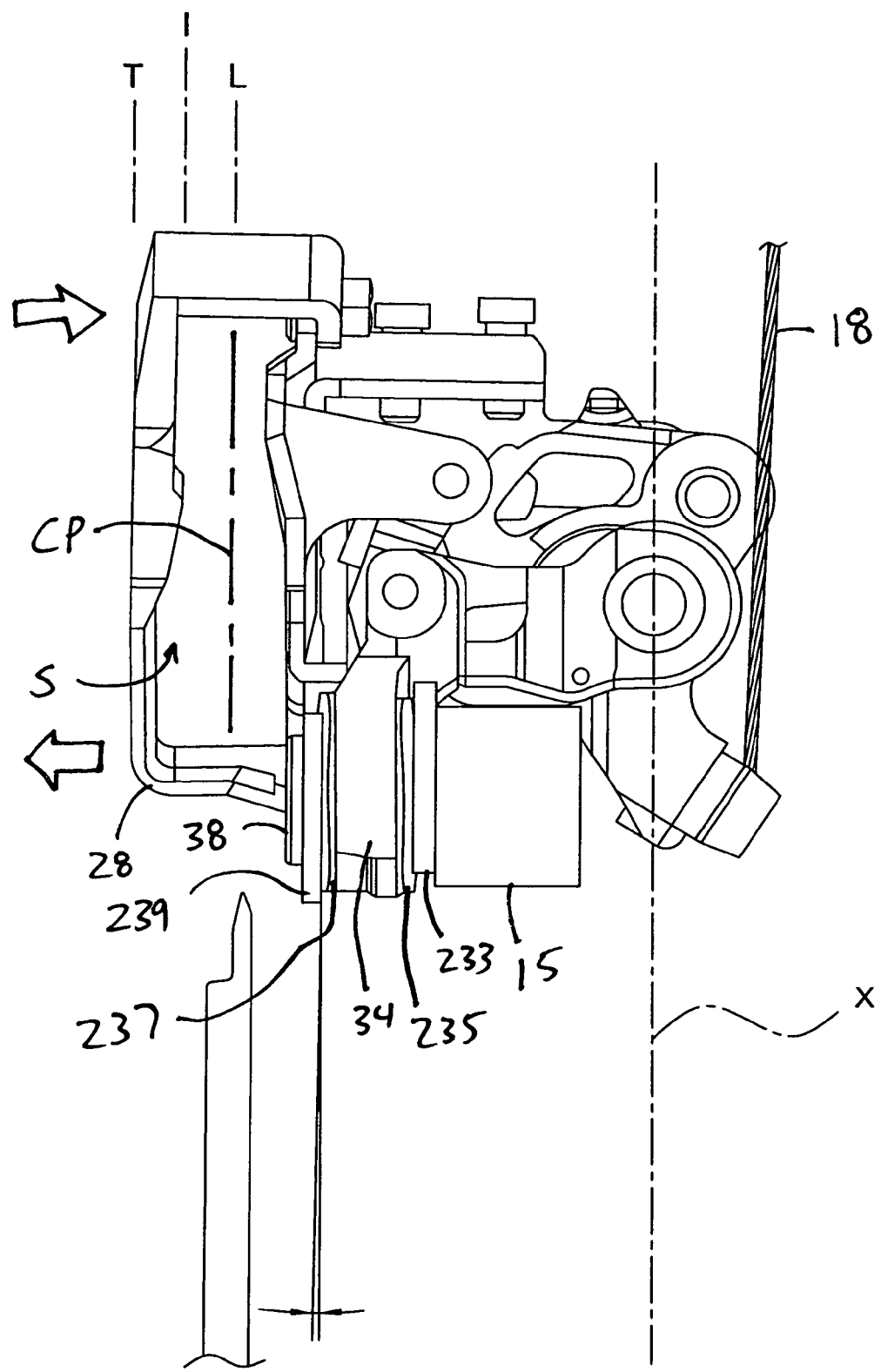
FIG. 28 is a front elevational view of the front derailleur illustrated in FIGS. 25 and 26 and the smallest front chain ring illustrated in FIG. 1, with the front derailleur mounted in an adjusted orientation relative to the seat tube attachment member.
Figure 29:
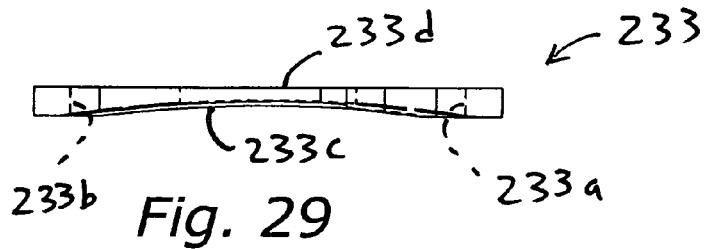
FIG. 29 is an enlarged, top plan view of an inner first washer member of the mounting fixture of the front derailleur illustrated in FIGS. 25-28.
Figure 30:
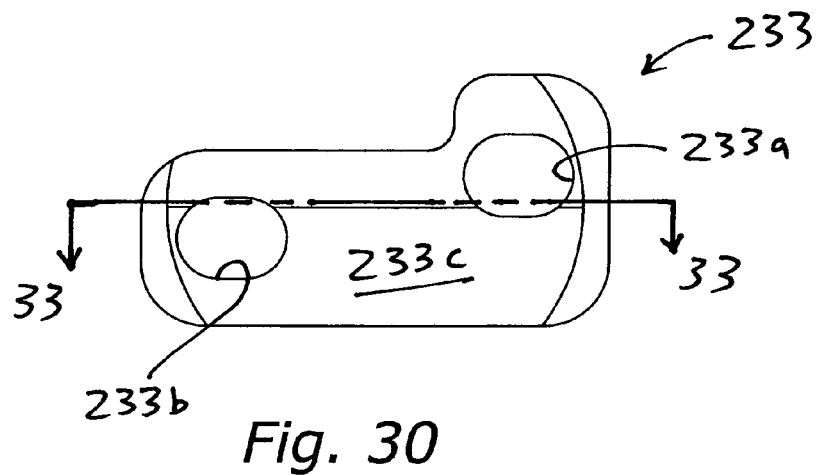
FIG. 30 is an outside elevational view of the inner first washer member illustrated in FIG. 29.
Figures 31, 32:
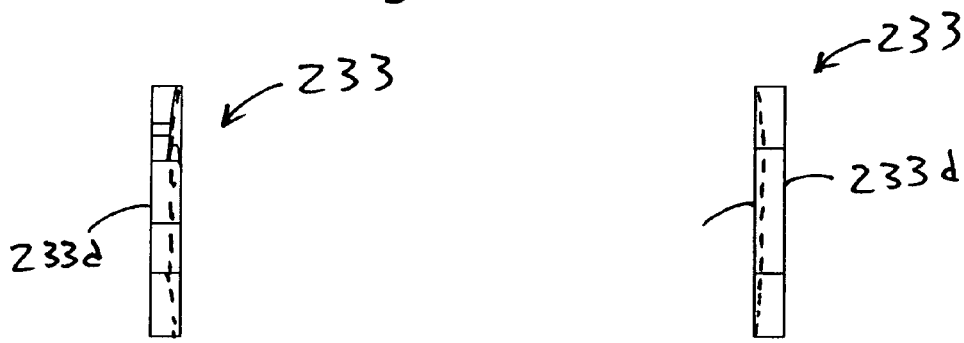
FIG. 31 is a rear elevational view of the inner first washer member illustrated in FIGS. 29 and 30.
FIG. 32 is a front elevational view of the inner first washer member illustrated in FIGS. 29-31.
Figure 33:
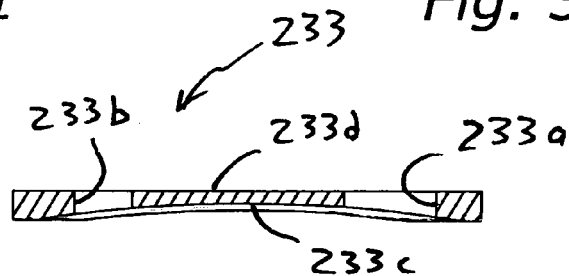
FIG. 33 is a cross-sectional view of the inner first washer illustrated in FIGS. 29-32, as seen along section line 33-33 of FIG. 30.
Figure 34:
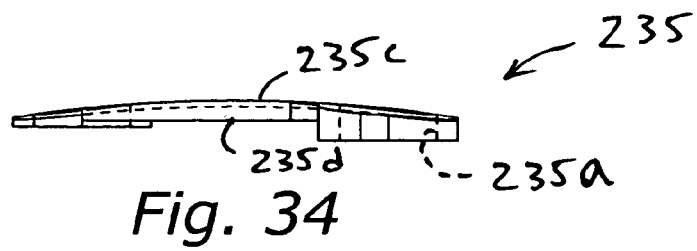
FIG. 34 is an enlarged, top plan view of an outer first washer member of the mounting fixture of the front derailleur illustrated in FIGS. 25-28.
Figure 35:
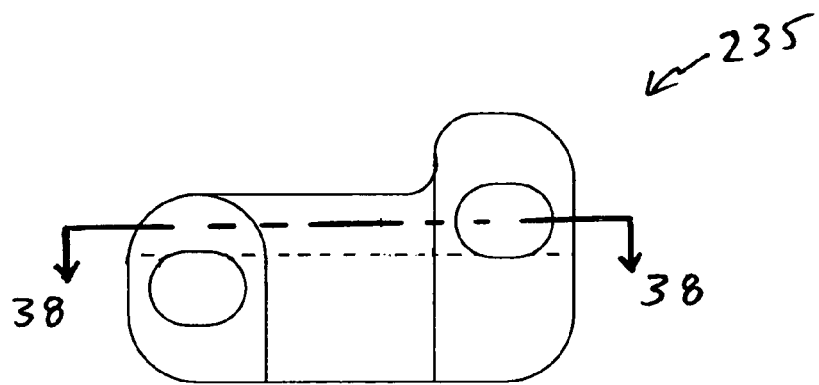
FIG. 35 is an outside elevational view of the outer first washer member illustrated in FIG. 34.
Figures 36, 37:
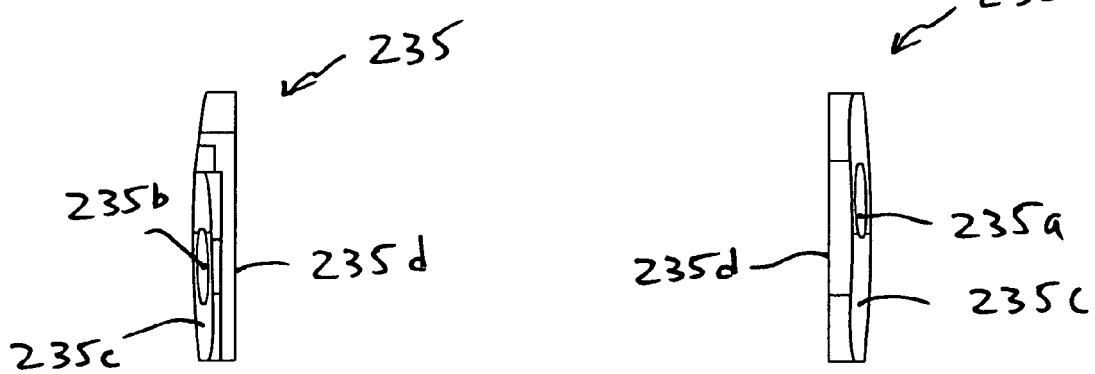
FIG. 36 is a rear elevational view of the outer first washer member illustrated in FIGS. 34 and 35.
FIG. 37 is a front elevational view of the outer first washer member illustrated in FIGS. 34-36.
Figure 38:
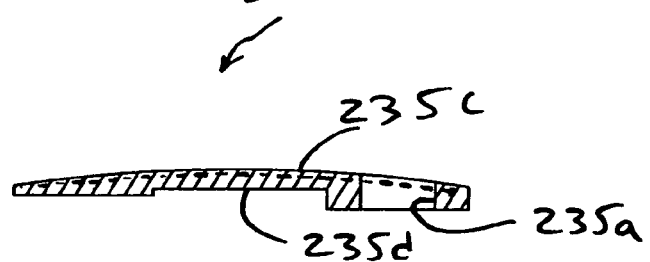
FIG. 38 is a cross-sectional view of the inner first washer illustrated in FIGS. 34-37, as seen along section line 38-38 of FIG. 35.
Figure 39:
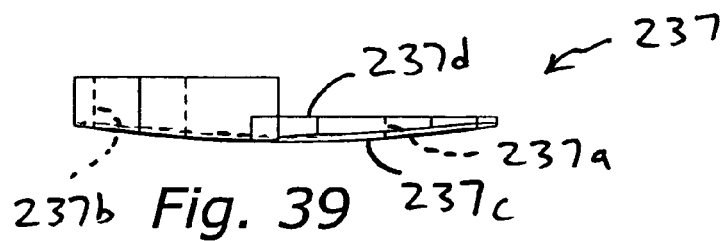
FIG. 39 is an enlarged, top plan view of an inner second washer member of the mounting fixture of the front derailleur illustrated in FIGS. 25-28.
Figure 40:
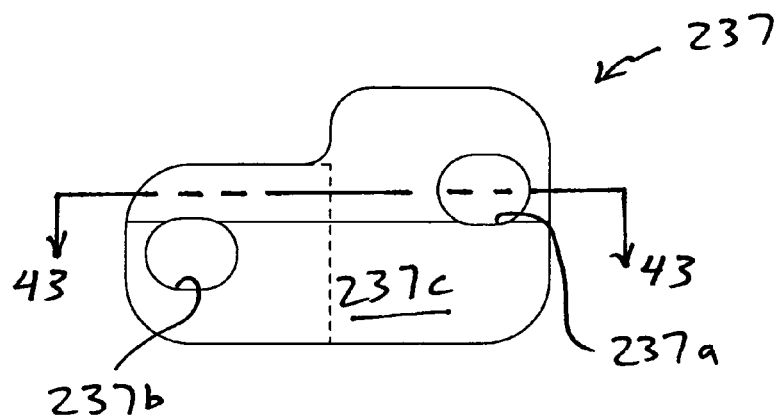
FIG. 40 is an outside elevational view of the inner second washer member illustrated in FIG. 39.
Figure 41:
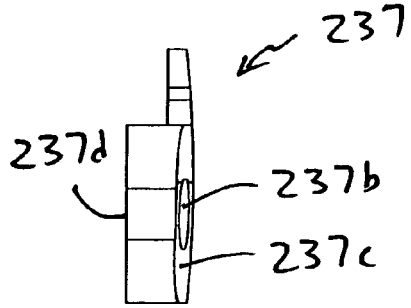
FIG. 41 is a rear elevational view of the inner second washer member illustrated in FIGS. 39 and 40.
Figure 42:
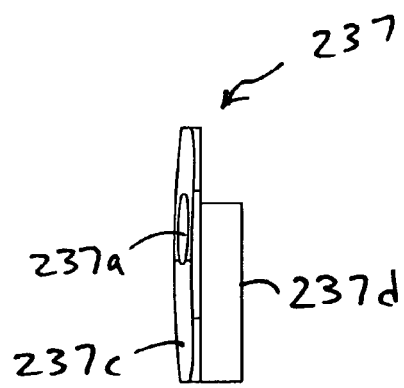
FIG. 42 is a front elevational view of the inner second washer member illustrated in FIGS. 39-41.
Figure 43:
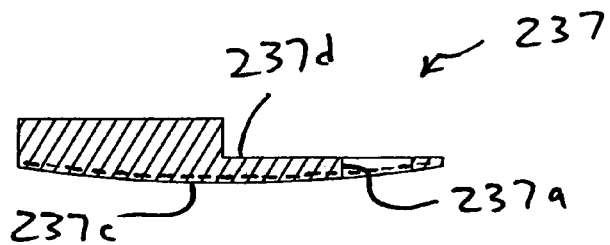
FIG. 43 is a cross-sectional view of the inner first washer illustrated in FIGS. 39-42, as seen along section line 43-43 of FIG. 40.
Figure 44:
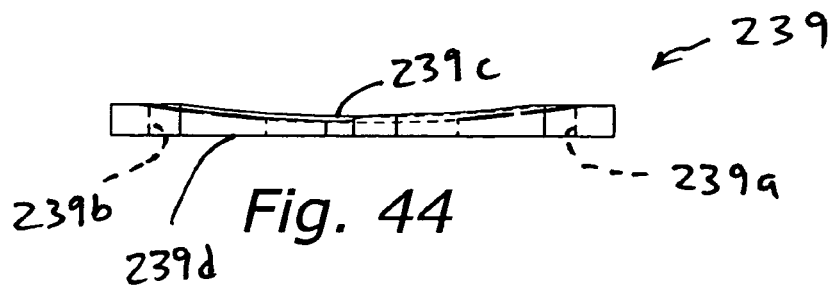
FIG. 44 is an enlarged, top plan view of an outer second washer member of the mounting fixture of the front derailleur illustrated in FIGS. 25-28.
Figure 45:
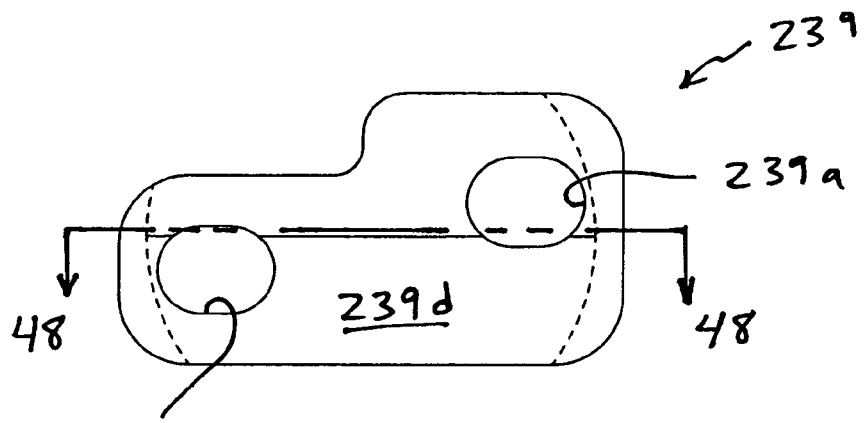
FIG. 45 is an outside elevational view of the outer second washer member illustrated in FIG. 44.
Figure 46:
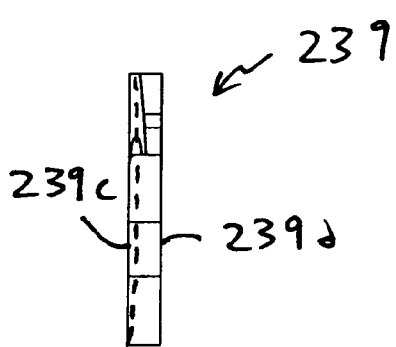
FIG. 46 is a rear elevational view of the outer second washer member illustrated in FIGS. 44 and 45.
Figure 47:
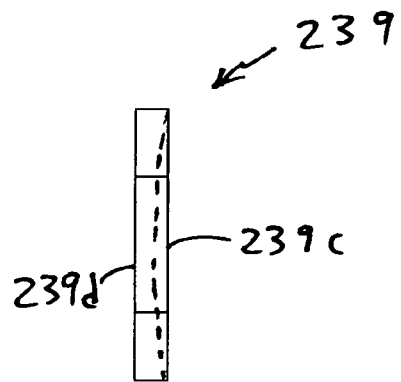
FIG. 47 is a front elevational view of the outer second washer member illustrated in FIGS. 44-46.
Figure 48:
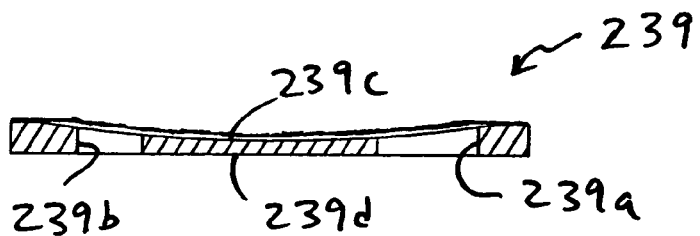
FIG. 48 is a cross-sectional view of the inner first washer illustrated in FIGS. 44-47, as seen along section line 48-48 of FIG. 45.
Figure 49:
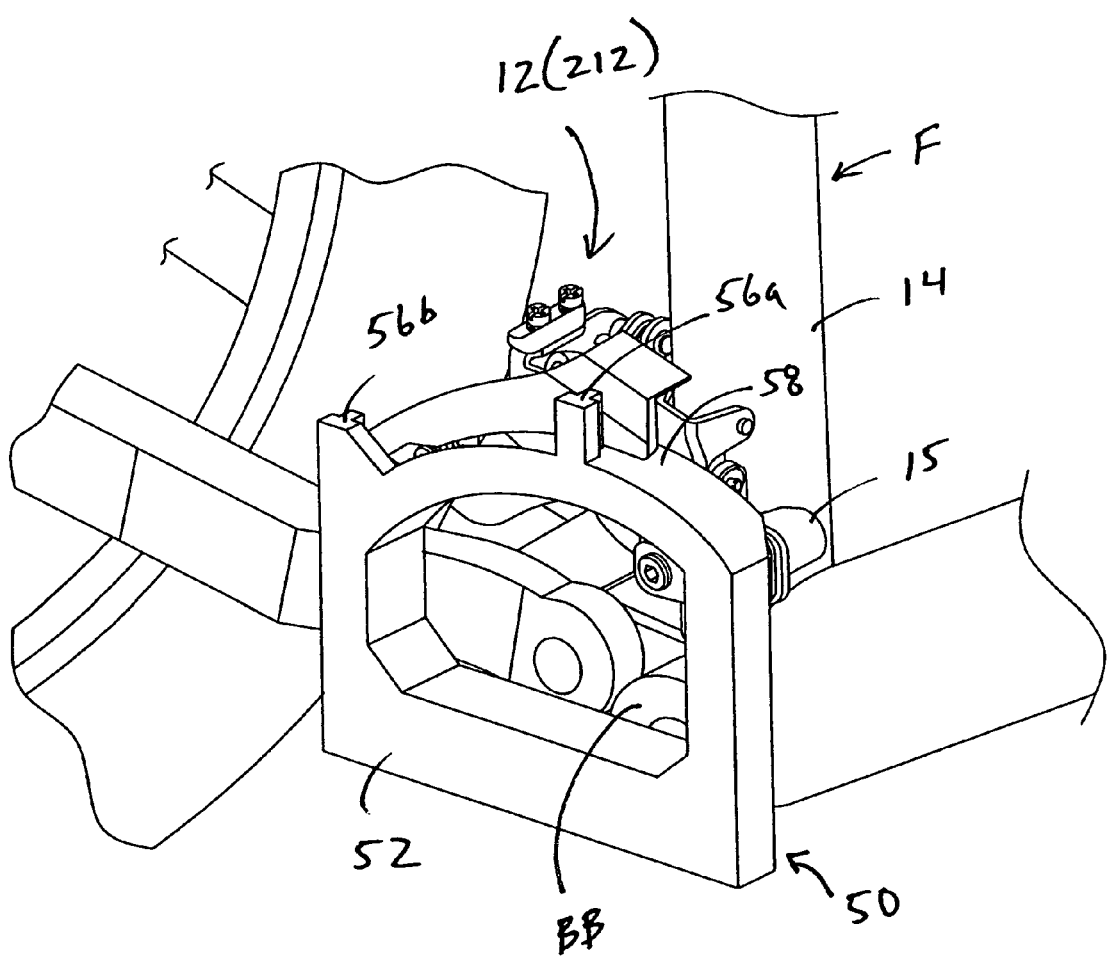
FIG. 49 is an enlarged, front perspective view of a portion of the frame of the bicycle illustrated in FIG. 1, with a bicycle front derailleur coupled thereto in accordance with the present invention, and with an alignment jig mounted to the bottom bracket in order to align the front derailleur in accordance with the present invention (with the front crankset and chain removed for the purpose of illustration)
Figure 50:
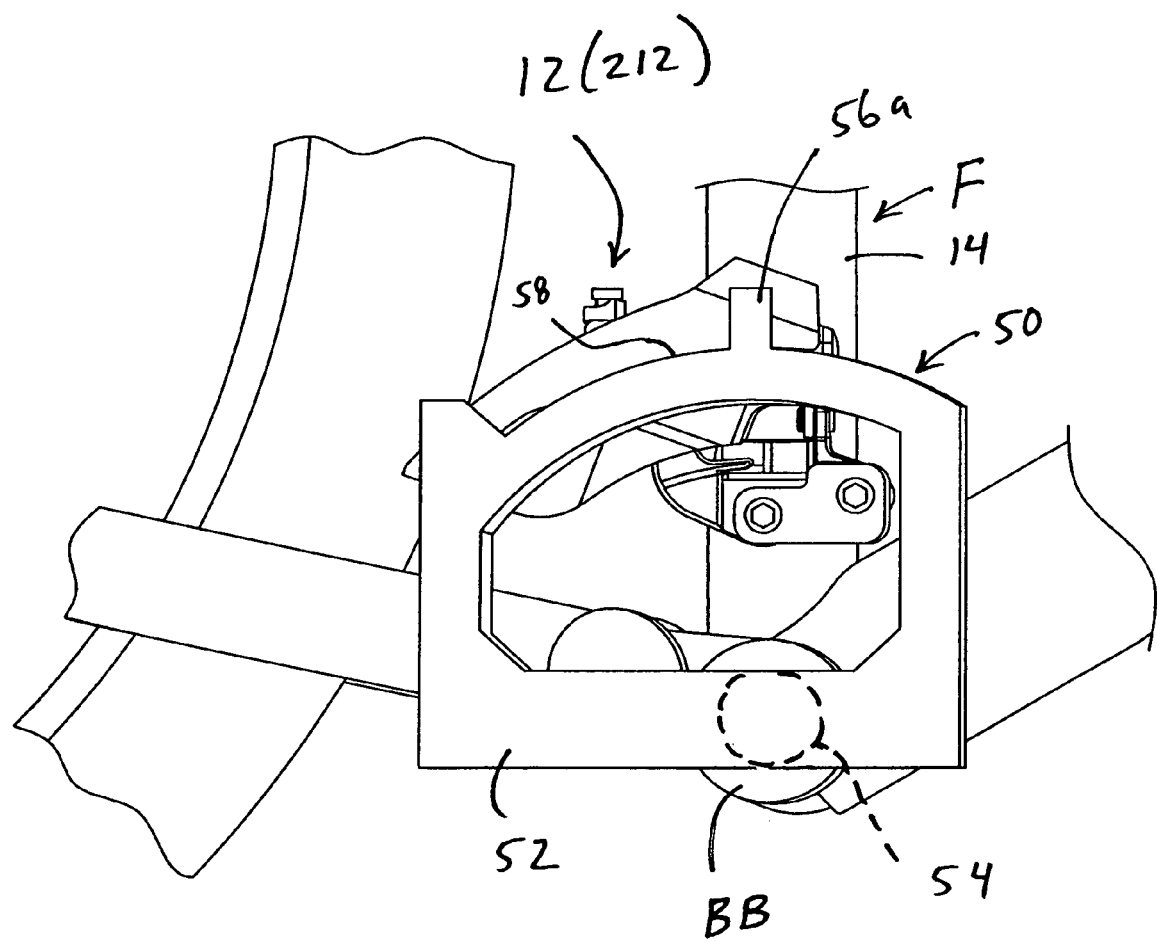
FIG. 50 is an outside elevational view of the front derailleur and alignment jig illustrated in FIG. 49.
Figure 51:
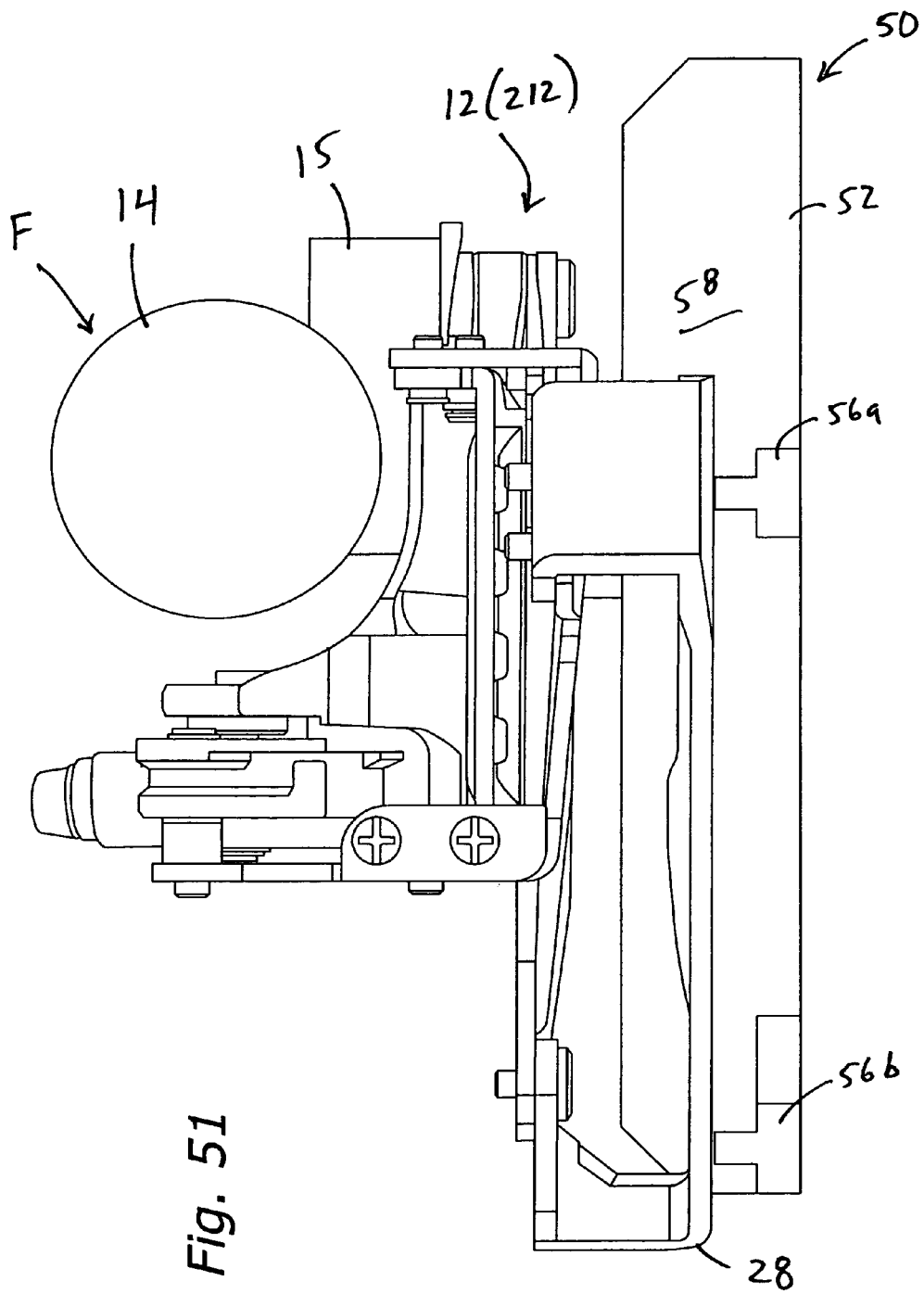
FIG. 51 is an enlarged, top plan view of the front derailleur and alignment jig illustrated in FIGS. 49 and 50.
Figure 52:
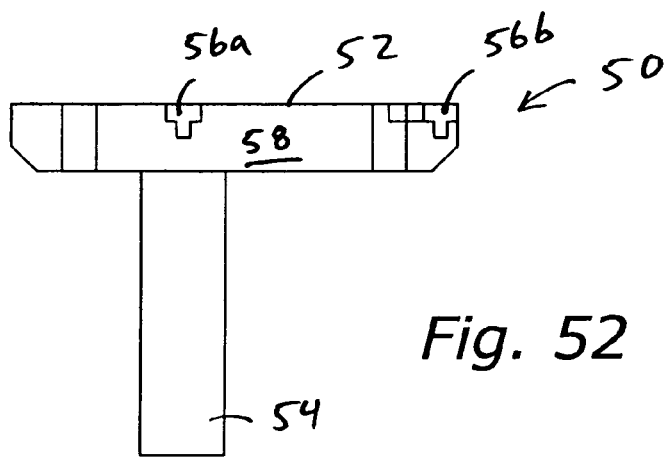
FIG. 52 is a rotated top plan view of the alignment jig illustrated in FIGS. 49-51.
Figure 53:
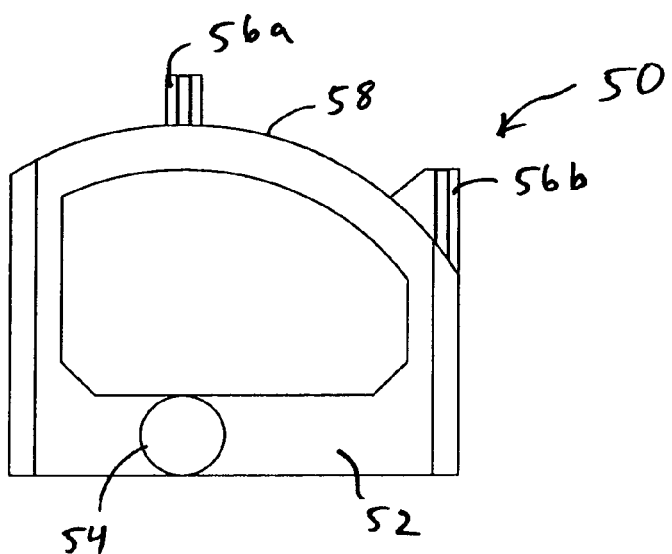
FIG. 53 is an inside elevational view of the alignment jig illustrated in FIG. 52.
Figure 54:
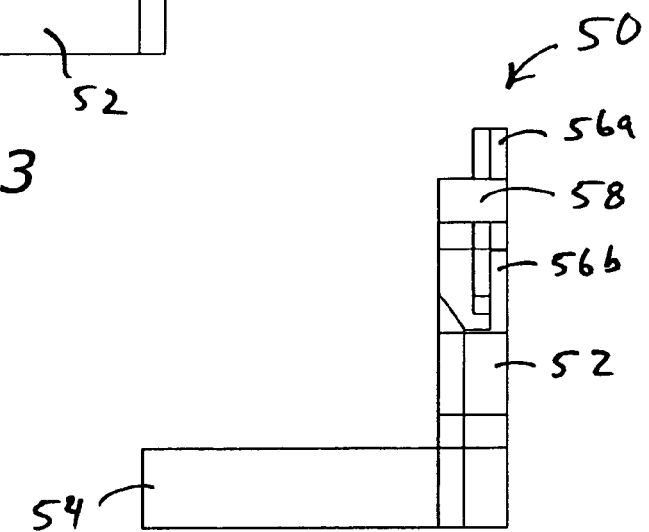
FIG. 54 is a rear end elevational view of the alignment jig illustrated in FIGS. 52 and 53.

Thus, the yaw of front derailleur 212 can be angularly adjusted in the manner explained above with respect to the first embodiment and illustrated in FIGS. 4 and 5. However, the pitch of front derailleur 212 can also be angularly configurations of the contact surfaces 233c, 235c, 237c and 239c in this embodiment. In other words, the derailleur 212 is adjustable as illustrated in FIGS. 4 and 5, as well as being adjustable as illustrated in FIGS. 27 and 28 due to spherical shapes of the contact surfaces 233c, 235c, 237c and 239c.

Alignment Jig

Referring now to FIGS. 49-54, the alignment jig 50 in accordance with the present invention will now be explained in more detail. The alignment jig 50 is used during installation of the front derailleurs 12 and 212. Specifically, the derailleurs 12 and 212 are preferably aligned in their proper position/orientations using the alignment jig 50 when the fasteners 38 are only partially tightened.

The alignment jig 50 basically includes a main body portion 52, a bottom bracket mounting portion 54 extending axially from a lower end of the main body portion 50, and a pair of alignment projections 56a and 56b extending upwardly from the main body portion 52. The main body portion 52 has a curved upper surface 58 that has a shape corresponding to the shape of an outer lower surface of the chain guide 28, as best understood from FIGS. 6, 49, 50 and 53. The bottom bracket mounting portion 54 has an outer surface configured and arranged to be received within a bottom bracket portion BB of the frame F of the bicycle 10. The alignment projections 56a and 56b extend upwardly from the curved upper surface 58 of the main body portion 52. The alignment projections 56a and 56b are configured and arranged to contact the outer most cage plate of the chain guide 28 when the chain guide 28 is properly oriented/positioned relative to the frame F of the bicycle 10. The curved upper surface 58 also contacts the outer lower surface of the chain guide 28 when the chain guide 28 is properly oriented/positioned relative to the frame F of the bicycle 10.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle front derailleur comprising:
    a fixed member including a frame mounting portion having at least one frame mounting hole and a linkage support portion;
    a chain guide configured to move between a retracted position and an extended position relative to the fixed member;
    a linkage assembly coupled between the linkage support portion and the chain guide in order to move the chain guide between the retracted position and the extended position; and
    a mounting fixture adjustably coupled to the fixed member, the mounting fixture including at least one frame fastener disposed in the frame mounting hole, a pair of first washer members disposed on a first side of the frame mounting portion and a pair of second washer members disposed on a second side of the frame mounting portion with the at least one frame fastener extending through the first and second washer members,
    one of the first washer members having a first convex contact surface that contacts a first concave contact surface of the other of the first washer members, and
    one of the second washer members having a second convex contact surface that contacts a second concave contact surface of the other of the second washer members, the first and second convex contact surfaces being convex in only one direction and the first and second concave contact surfaces being concave in only one direction, with each of the first and second convex contact surfaces and each of the first and second concave contact surfaces having a respective center of curvature located along a single axis that is parallel to a longitudinal plane of a bicycle having the front derailleur,
    the first and second washer members having through holes with widths larger than a diameter of the frame fastener in at least a direction extending along arcs of the first and second concave surfaces such that the first and second washer members can shift relative to the frame fastener and with respect to each other to adjust an angular orientation of the chain guide and an angular orientation of the frame mounting portion relative to the longitudinal plane only in a direction transverse to the longitudinal plane.

2. The bicycle front derailleur according to claim 1, wherein
    the frame mounting hole of the frame mounting portion is an unthreaded through hole and the frame fastener includes a threaded shaft extending through the frame mounting hole.

3. The bicycle front derailleur according to claim 1, wherein
    the frame mounting hole and the frame fastener extend in a direction substantially perpendicular to a longitudinal center plane of a chain receiving space of the chain guide.

4. The bicycle front derailleur according to claim 1, wherein
    the frame mounting portion includes a pair of frame mounting holes with a pair of frame fasteners disposed therein that extend through the first and second washer members.

5. The bicycle front derailleur according to claim 4, wherein
    the frame mounting holes are unthreaded through holes and the frame fasteners are threaded bolts.

6. The bicycle front derailleur according to claim 4, wherein
    the frame mounting holes and the frame fasteners extend in a direction substantially perpendicular to a longitudinal center plane of a chain receiving space of the chain guide.

7. The bicycle front derailleur according to claim 1, wherein
    the first and second convex and concave contact surfaces have substantially cylindrical configurations.

8. The bicycle front derailleur according to claim 1, wherein
    the frame mounting portion includes a pair of frame mounting holes with a pair of frame fasteners disposed therein that extend through the first and second washer members.

9. The bicycle front derailleur according to claim 8, wherein
    the frame mounting holes are unthreaded through holes and the frame fasteners are threaded bolts.

10. The bicycle front derailleur according to claim 8, wherein
    the frame mounting holes and the frame fasteners extend in a direction substantially perpendicular to a longitudinal center plane of a chain receiving space of the chain guide.

* * * * *